(12) United States Patent
Fujita et al.

(10) Patent No.: US 6,817,674 B2
(45) Date of Patent: Nov. 16, 2004

(54) SEAT STRUCTURE

(75) Inventors: Etsunori Fujita, Hiroshima (JP);
Kazuyoshi Chizuka, Hiroshima (JP);
Seiji Kawasaki, Hiroshima (JP); Yumi Ogura, Hiroshima (JP); Naoki Ochiai, Hiroshima (JP); Yasuhide Takata, Hiroshima (JP); Shigeyuki Kojima, Hiroshima (JP); Miho Kikusui, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/309,605

(22) Filed: Dec. 4, 2002

(65) Prior Publication Data

US 2003/0127902 A1 Jul. 10, 2003

(30) Foreign Application Priority Data

Dec. 20, 2001 (JP) ........................... 2001-387104

(51) Int. Cl.$^7$ ................................. A47C 7/02
(52) U.S. Cl. .................. 297/452.48; 297/452.27; 297/452.56; 297/452.13
(58) Field of Search .................. 297/452.48, 452.27, 297/452.56, 452.13

(56) References Cited

U.S. PATENT DOCUMENTS

| 5,833,320 A | 11/1998 | Kaneko et al. ........ 297/452.27 |
| 6,302,487 B1 * | 10/2001 | Fujita et al. ........... 297/452.56 |
| 6,378,949 B1 * | 4/2002 | Maeda et al. .......... 297/452.56 |
| 6,485,103 B1 * | 11/2002 | Yamada et al. ........ 297/452.56 |
| 6,561,580 B1 * | 5/2003 | Bergey .................... 297/216.1 |

FOREIGN PATENT DOCUMENTS

| DE | 4238549 | 5/1994 |
| DE | 10029221 | 1/2001 |
| EP | 1070470 | 7/1999 |
| EP | 1084902 | 9/2000 |
| EP | 1193117 | 9/2000 |
| EP | 1193120 | 10/2000 |

* cited by examiner

Primary Examiner—Laurie K. Cranmer
(74) Attorney, Agent, or Firm—Steinberg & Raskin, P.C.

(57) ABSTRACT

The object of the present invention is to suppress rebound of a human body by making a reaction force small due to a large damping ratio. A bulging portion 11 is formed at a seat cushioning member 14 which is a tension structure. This structure has a structure of changing the damping characteristics functioned by the change in strain energy and tension by deformation created by a plane wave of the tension structure in accordance with the magnitude of the excitation force of an inputted vibration. Therefore, since the damping characteristics function with a small damping ratio to an input of a small excitation force, it can relieve the vibration with a phase difference due to the spring property of the seat cushioning member 14 and/or a back cushioning member 24, and to an input of a large excitation force, by increase of the strain energy and decrease of the tension, the damping characteristics function with a large damping ratio and a long operating time, so that rebound of a human body upward can be suppressed.

17 Claims, 31 Drawing Sheets

F I G. 1
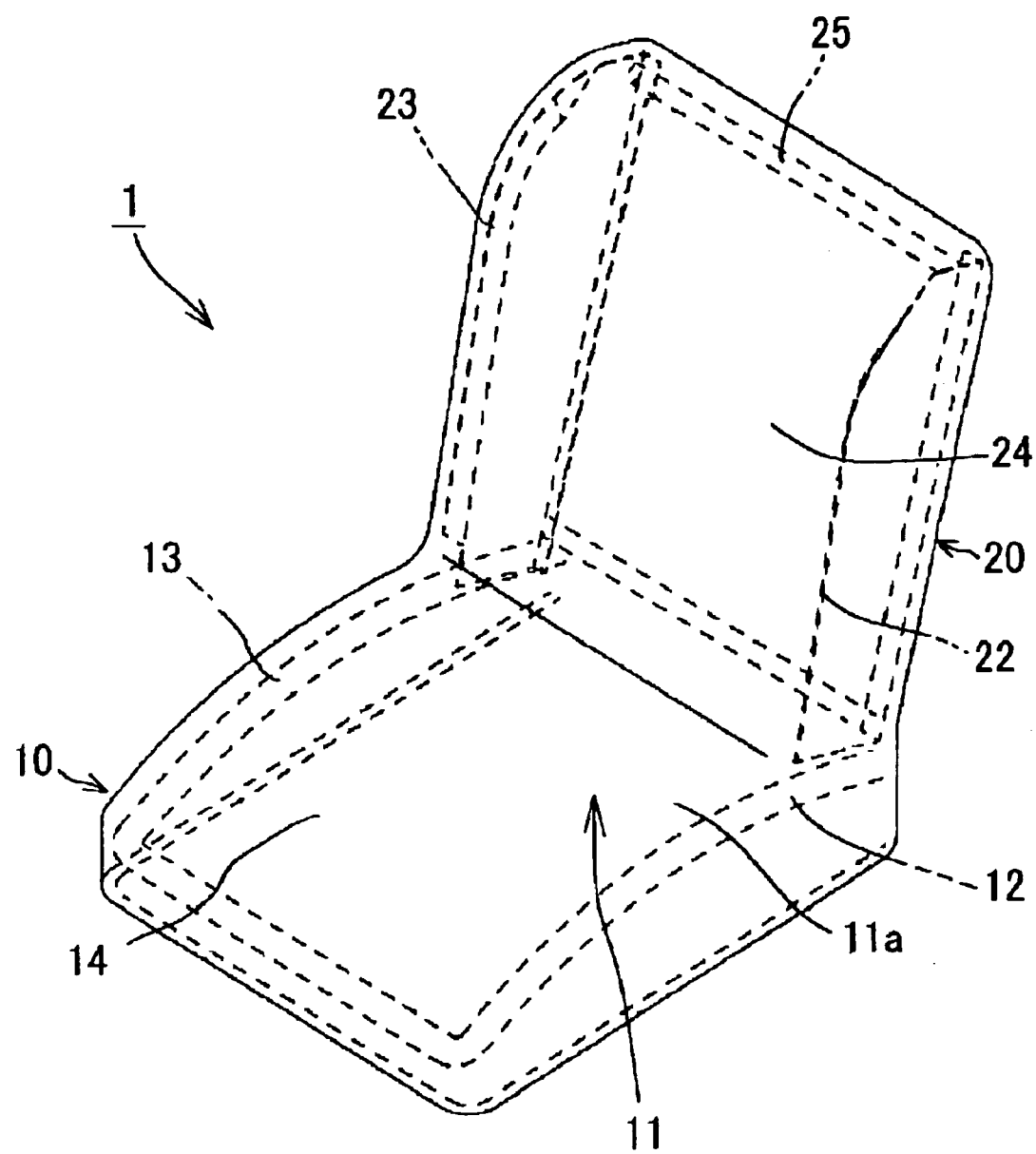

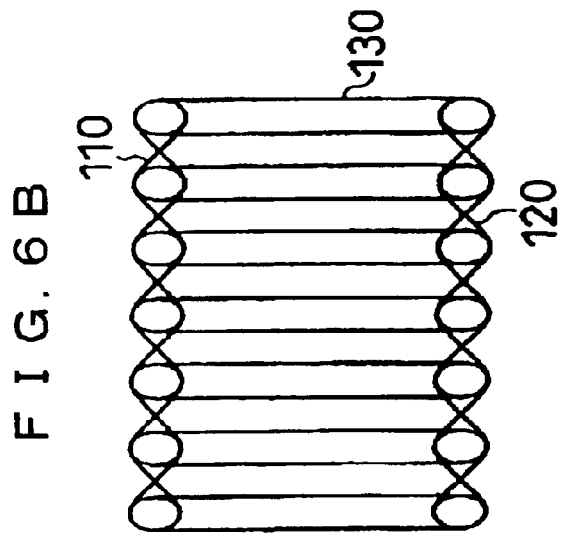
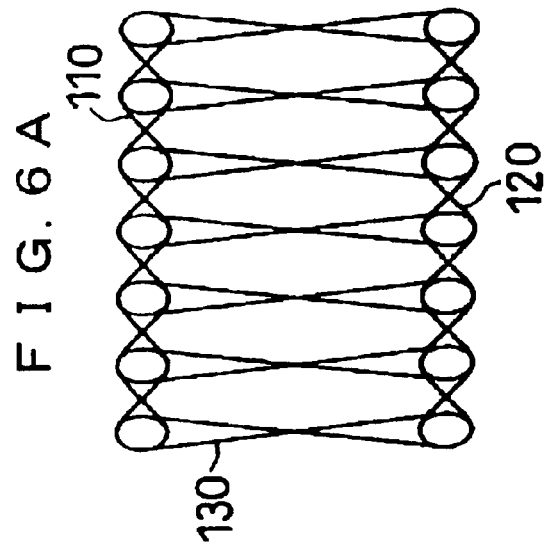
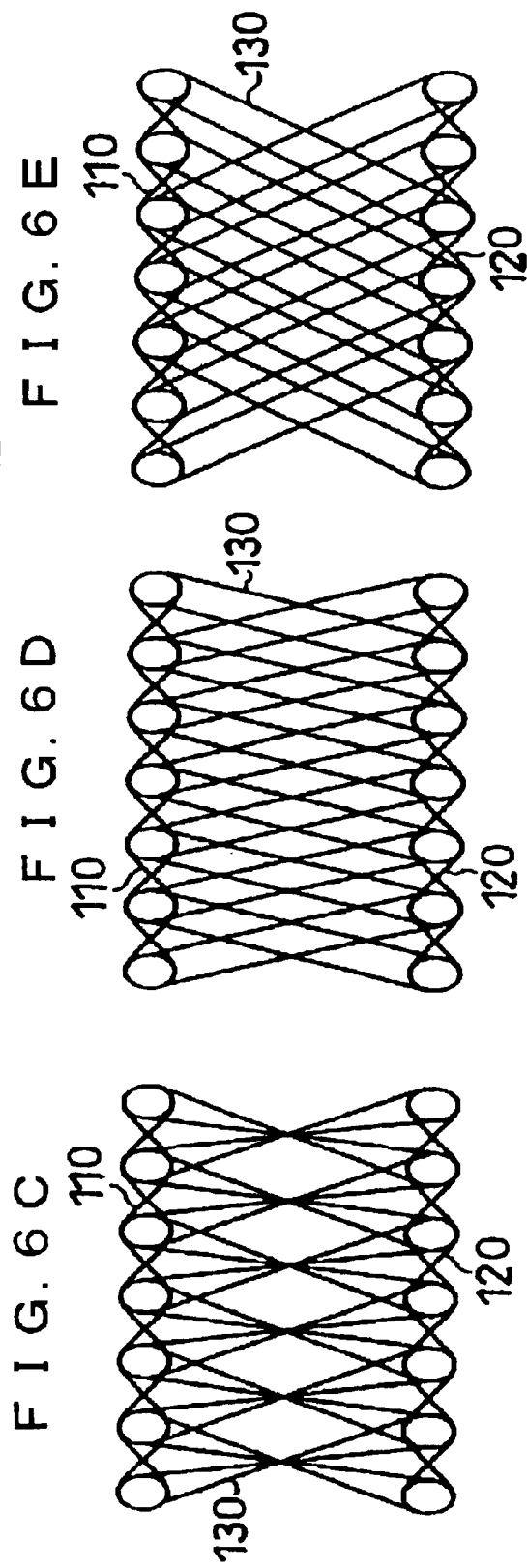

F I G. 8
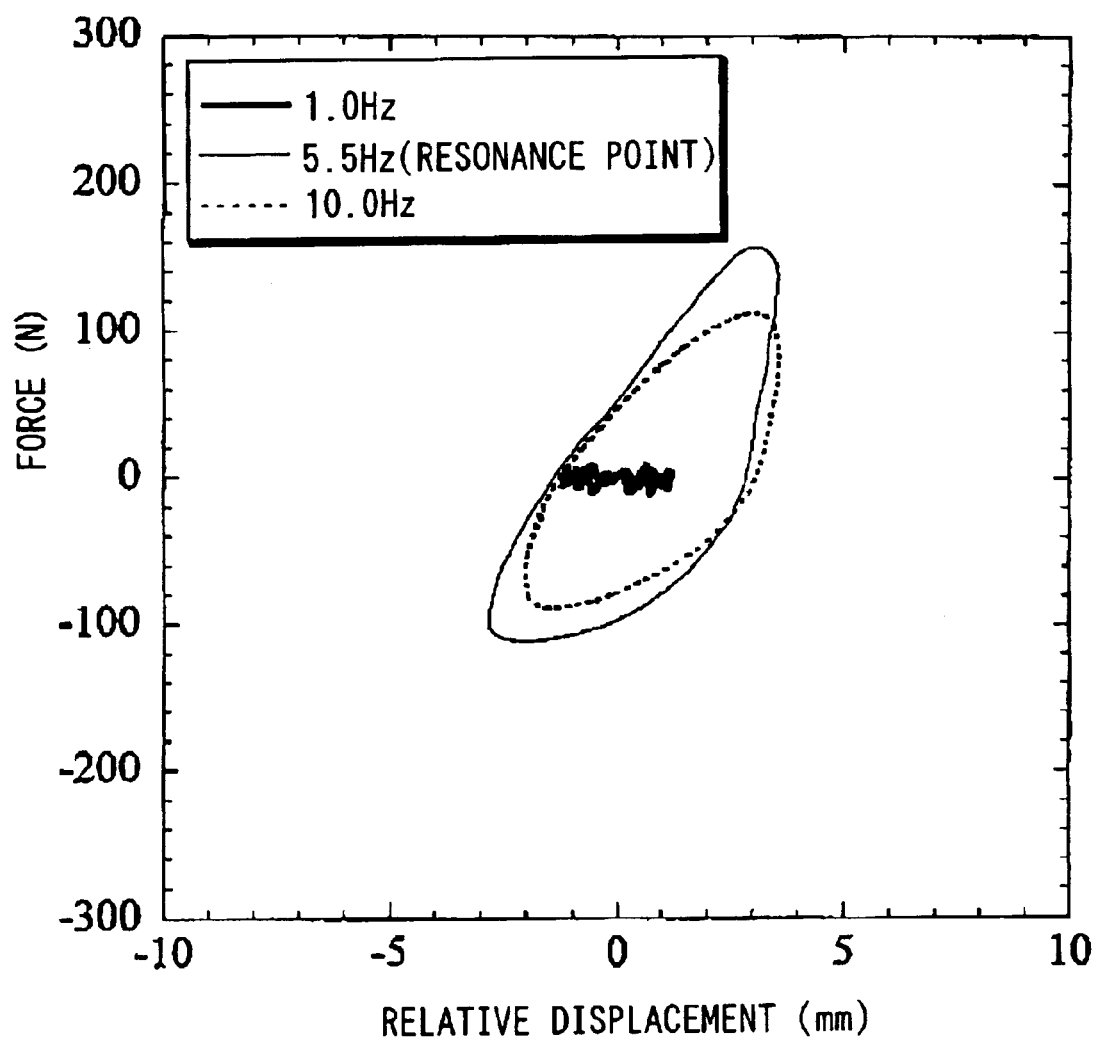

F I G. 1 2
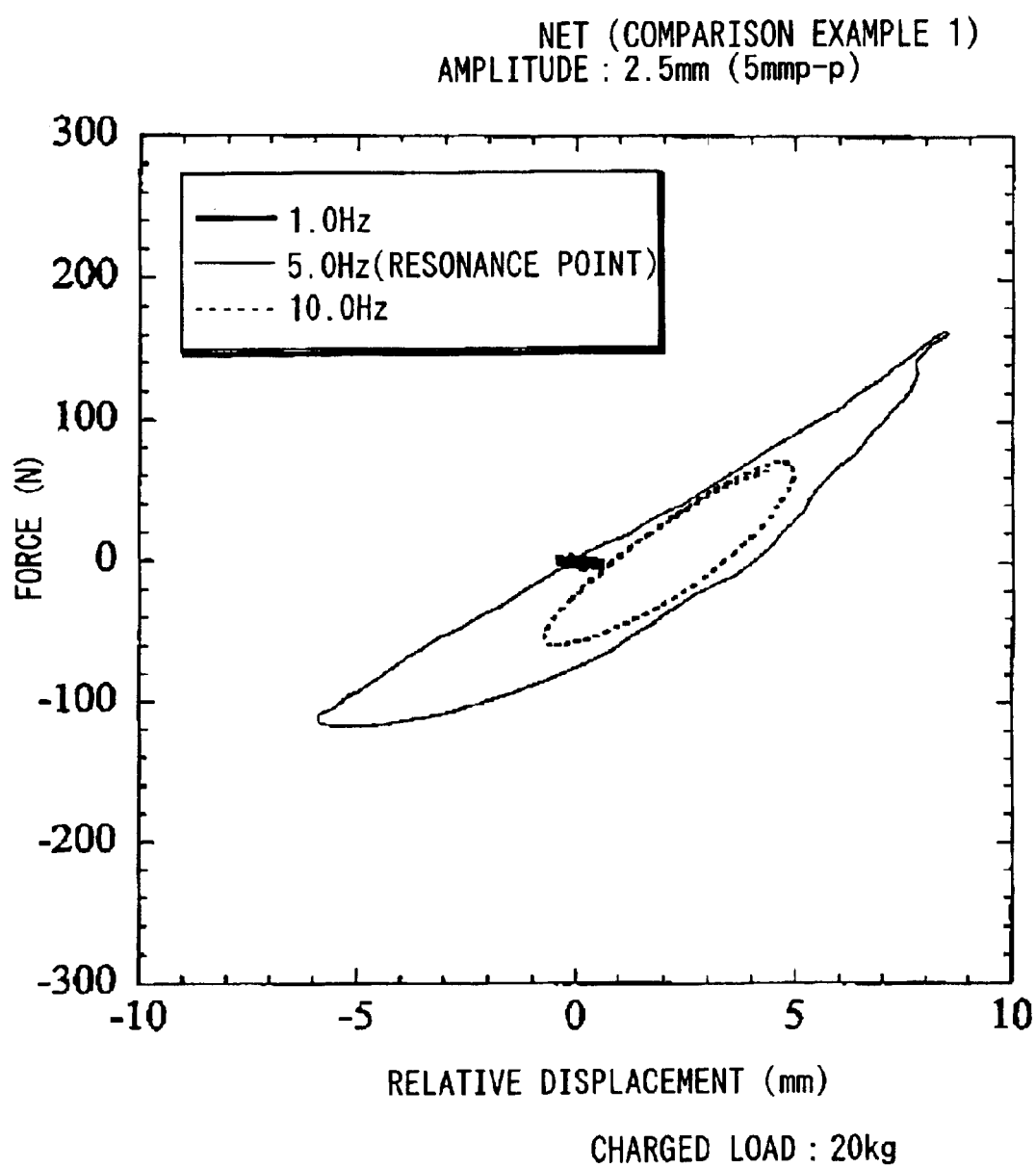

STATIC LOAD CHARACTERISTICS-φ200/1000N (COMPARISON EXAMPLE 2)
TEST SPEED : 50mm/min
COMPRESSION BOARD : φ200mm F I G. 1 7
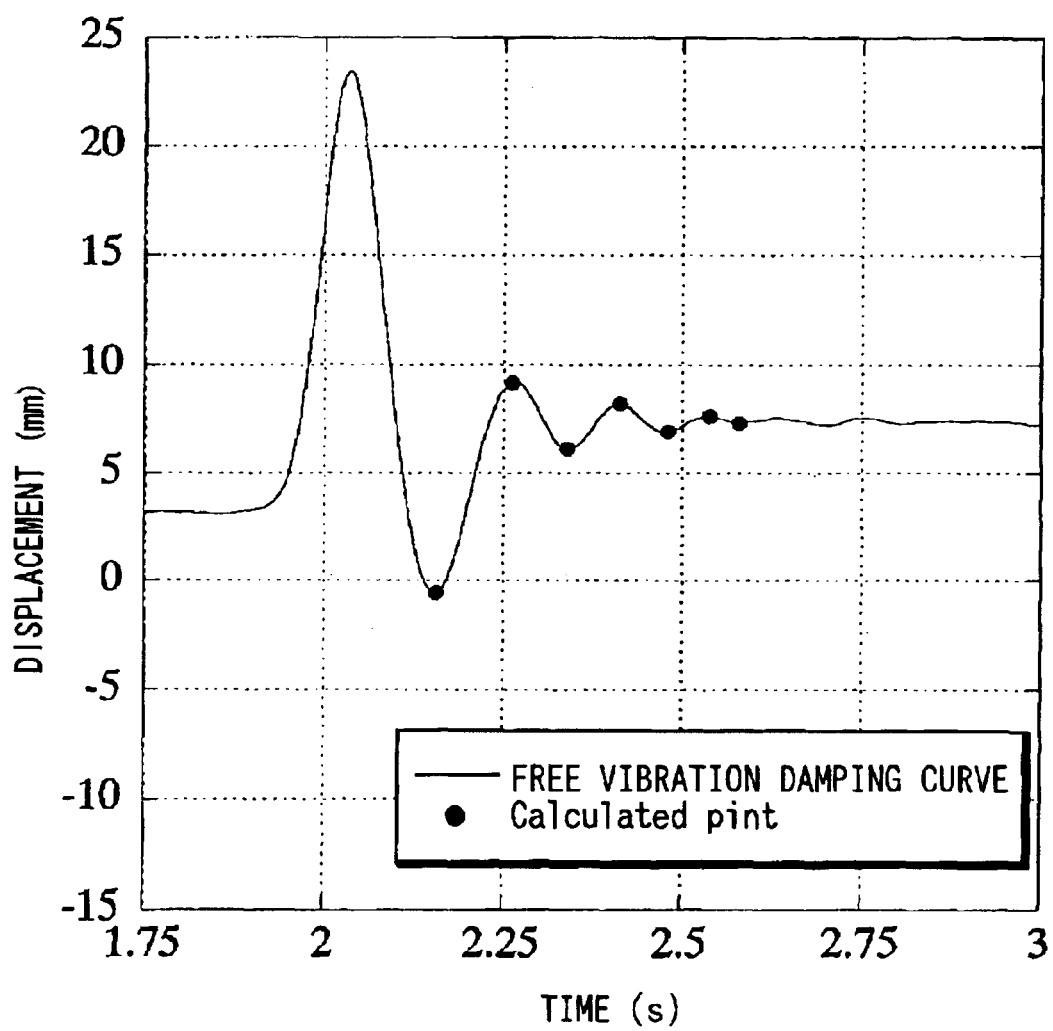

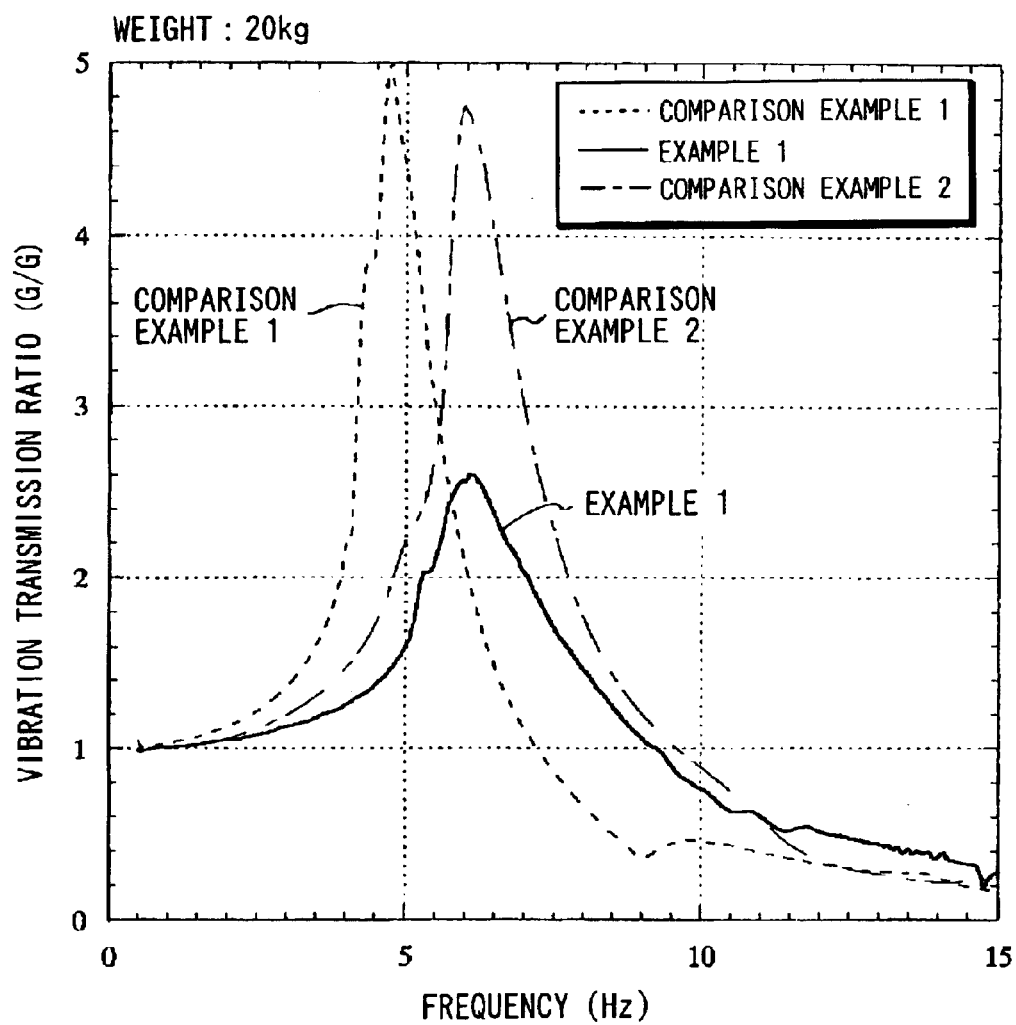

F I G. 2 4
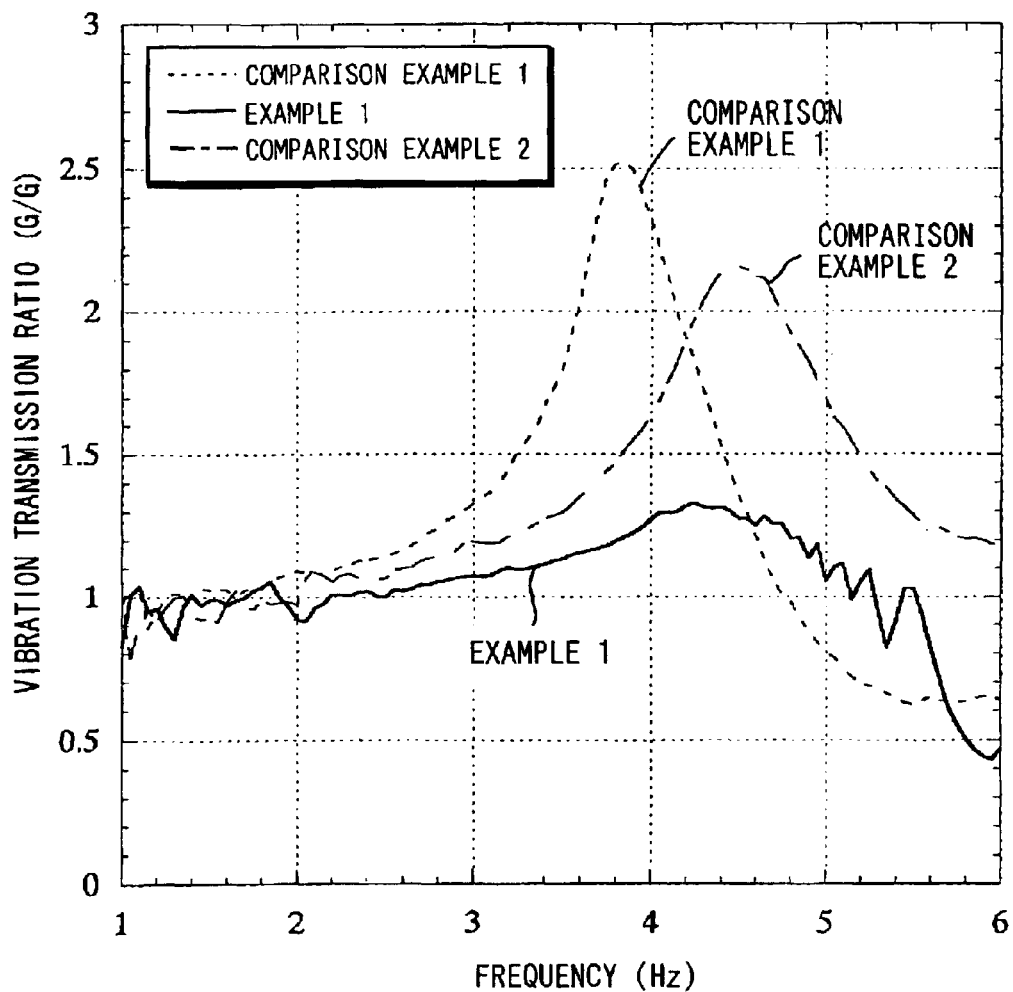

F I G. 2 7
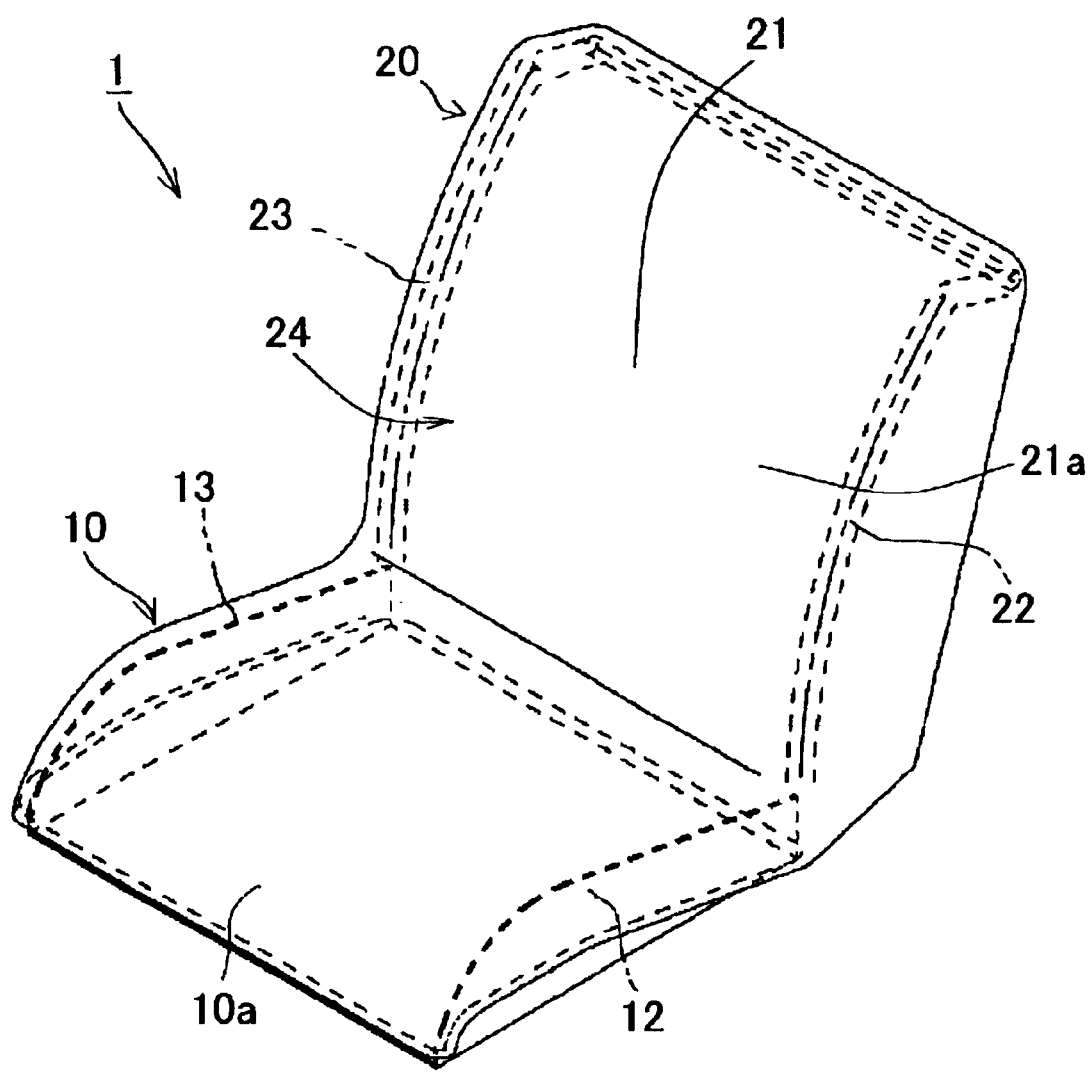

BREAST PORTION ACCELERATION

WAIST PORTION ACCELERATION

SEAT STRUCTURE

BACKGROUND OF THE INVENTION

1. Field of the Invention

The present invention relates to a seat structure, more in detail, to a seat structure suitable for transportation machines such as a plane, a train, a ship, a fork lift, and an automobile, or for various chairs used in the inside or the outside of a building.

2. Description of the Related Art

Polyurethane foam or a structure composed of a combination of a polyurethane foam and a metal spring are usually used as a cushioning material used for a seat for a plane, a train, a ship, and an automobile. Among spring characteristics and damping characteristics which polyurethane foam possesses, usually former spring characteristics are thought as important in design in consideration of vibration absorption property and displacement amount.

However, there is an individual difference in a shape of the haunches and a shape of a skeletal structure (shape of the letter S) of the back of a human body, fitness of a seat cushion portion or a seat back portion of a seat is not sufficient for the human body, and there arises deviation in the manner of contact of the human body to the seat cushion portion and the seat back portion of a seat. Therefore, there is a room to improve in point of a body pressure dispersion property. Further, in the above described vehicle seat, it is always required to absorb more efficiently an impact energy caused by collision.

On the other hand, the present inventors have proposed various seat structures for transportation machines in which three-dimensional net member is used as a cushioning material. Especially, a three-dimensional net member shows cushioning characteristic (spring characteristics and damping characteristics) equal to that of polyurethane foam and excellent in air permeability because it can be used as a tension field by providing it as a tension structure member through suspension onto a frame though it is a thin type. When this three-dimensional net member is used as a cushioning material, in order to function the damping characteristics sufficiently due to deformation of the three-dimensional net member, it is provided with almost no tension between the side frames at the time of no load so that the elongation thereof is set to be 5% or less in a static seating state.

However, there is a demand for a seat structure having a narrow seat width, for instance, only about 380 mm to about 400 mm in the seat width. When the three-dimensional net member is provided loosely without almost no rate of elongation on a seat having such a narrow width, since the acromion, the scapula, the haunches and the pelvis come close to the frame of the seat side portion due to thinness of the three dimensional net member, a feeling of something foreign coming from these portions is apt to be felt when a person is seated.

In order to solve the above disadvantage, it is conceivable to make sinking-in small when a person is seated by putting up the three-dimensional net member with predetermined tension. However, when taking this means, a feeling of stroke on seating is disappeared, and hard feeling of seating with no fitness is felt by a seated person and when back-and-forth vibration is inputted, slipping of the backside is apt to occur. Further, there remains a problem in vibration absorption characteristics when a large excitation force such as vibration having a large amplitude is inputted because a spring constant becomes high on seating.

SUMMARY OF THE INVENTION

The present invention is achieved in view of the above problems, and the object of the present invention is to provide a seat structure in which rebound of a human body can be suppressed with a small reaction force due to large damping ratio and the impact force inputted into a human body is relaxed by damping the impact force on large deformation such as input of impact force, in particular, by forming a predetermined tension field at least one of a seat cushioning member and a back cushioning member to make a structure in which damping characteristics are thought more important than spring characteristics, and on the other hand, vibration relief property is not lost against input with a small excitation force due to the spring characteristics by making the effect of the damping characteristics small. In addition to this, when a three-dimensional net member is used as a cushioning member, a feeling of something foreign in the frame to a human body is more reduced and a feeling of stroke can be increased in comparison with a seat structure using a conventional three-dimensional net member.

In order to solve the above-described problems, in claim 1 of the present invention, provided is a seat structure comprising a cushion structure having a seat cushioning member for a seat cushion and a back cushioning member for a seat back, wherein the seat cushioning member and the back cushioning member are provided as a tension structure having a tension field formed from an elastic member, and at least one of the seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force.

In claim 2 of the present invention, provided is the seat structure according to claim 1, wherein the cushioning structure forms a vibration system in which an arbitrary portion of the seat cushioning member positioned more front than the vicinity of the boundary of the seat cushion portion and the seat back portion and/or an arbitrary portion of the back cushioning member positioned upper than the vicinity of the boundary portion serves as an free end by putting an extendable direction on the plane surface of the cushioning structure along the back-and-forth direction of the seat cushion portion and along the vertical direction of the seat back portion respectively, and by holding the vicinity of the boundary portion of the seat cushion portion and the seat back portion; and wherein in at least one of the seat cushioning member and back cushioning member in which the vibration system is formed, tension in the tangential direction is varied by changing the strain energy of the tension structure formed from an elastic member in accordance with the excitation force to be an input, and at least the other of the seat cushioning member and back cushioning member includes a portion exhibiting relatively high spring characteristics in the normal line direction of the tension structure, and has a structure in which an excitation force inputted from the normal line direction to the cushioning member is scatterable into an excitation force in the tangential direction by a combined function of these different characteristics.

In claim 3 of the present invention, provided is the seat structure according to claim 1, wherein any of the seat cushioning member and the back cushioning member which can exhibit damping characteristics different in damping ratio according to the magnitude of the excitation force to be an input is formed of a three-dimensional net member made by connecting a pair of ground knitted fabrics disposed apart from each other with a connecting fiber; and wherein the cushioning member is put up at a rate of elongation of 30% or less between side frames provided in the seat cushion portion or in the seat back portion at the time of no load, and is arranged to be in a camber shape provided with a top portion bulging upward in the case of the seat cushion portion and forward in the case of the seat back portion within an area of contact with a human body.

In claim 4 of the present invention, provided is the seat structure according to claim 1, wherein both of the seat cushioning member and back cushioning member are formed of a three-dimensional net member which is formed of a pair of ground knitted fabrics disposed apart from each other connected with a connecting fiber; and wherein any of the cushioning members which can exhibit damping characteristics different in damping ratio according to the magnitude of the excitation force to be an input is put up at a rate of elongation of 30% or less between side frames provided in the seat cushion portion or in the seat back portion at the time of no load, and is arranged to be in a camber shape provided with a top portion bulging upward in the case of the seat cushion portion and forward in the case of the seat back portion within an area of contact with a human body.

In claim 5 of the present invention, provided is the seat structure according to claim 1, wherein any of the seat cushioning member and the back cushioning member which can exhibit damping characteristics different in damping ratio according to the magnitude of the excitation force to be an input is formed of a tension structure with urethane provided with a two-dimensional tension structure and an urethane layer to be layered in the two-dimensional tension structure; and wherein the cushioning member is put up at a rate of elongation of 30% or less between side frames provided in the seat cushion portion or in the seat back portion at the time of no load, and is arranged to be in a camber shape provided with a top portion bulging upward in the case of the seat cushion portion and forward in the case of the seat back portion within an area of contact with a human body.

In claim 6 of the present invention, provided is the seat structure according to claim 1, wherein both of the seat cushioning member and the back cushioning member are formed of a tension structure with urethane provided with a two-dimensional tension structure and an urethane layer to be layered in the two-dimensional tension structure; and wherein any of the cushioning members which can exhibit damping characteristics different in damping ratio according to the magnitude of the excitation force to be an input is put up at a rate of elongation of 30% or less between side frames provided in the seat cushion portion or in the seat back portion at the time of no load, and is arranged to be in a camber shape provided with a top portion bulging upward in the case of the seat cushion portion and forward in the case of the seat back portion within an area of contact with a human body.

In claim 7 of the present invention, provided is the seat structure according to any one from claim 3 to claim 6, wherein the top of the bulging portion of the seat cushioning member or back cushioning member having a camber shape is arranged to be deformable to shift each of the positions thereof forward for the seat cushion portion and upward for the seat back portion in a equilibrium state within an area of contact with a human body.

In claim 8 of the present invention, provided is the seat structure according to any one from claim 3 to claim 6, wherein the camber shape of the seat cushioning member or the back cushioning member is formed in a range of 200 mm to 3000 mm in radius.

In claim 9 of the present invention, provided is the seat structure according to any one from claim 3 to claim 6, wherein the seat cushioning member or the back cushioning member having the camber shape is put up between the side frames having an arch shape in the width direction.

In claim 10 of the present invention, provided is the seat structure according to any one from claim 3 to claim 6, wherein the seat cushioning member is formed to be a camber shape, and the top thereof is in front 100 mm or more from the boundary of the seat cushion portion and the seat back portion seen from the side, and in front of the portion under the tuber of ischium.

In claim 11 of the present invention, provided is the seat structure according to any one from claim 3 to claim 6, wherein a rate of elongation of the seat cushioning member or back cushioning member is set to be partially different in the range of the rate of elongation of 30% or less.

In claim 12 of the present invention, provided is the seat structure according to claim 11, wherein the cushioning members are put up at a relatively high rate of elongation compared with other portions in the vicinity of the tuber of ischium and in the vicinity of the lumber vertebra.

In claim 13 of the present invention, provided is the seat structure according to claim 1, wherein any of the seat cushioning member and the back cushioning member which can exhibit damping characteristics different in damping ratio according to the magnitude of the damping force to be an input is made of a layered structure, the layers comprising:

a first soft urethane layer disposed as an upper layer and having an spring constant close to the spring constant of the muscle of a human body;

a second urethane layer disposed as a middle layer and having a high restoring property of 0.1 or more in linearity and 30% or less in hysteresis loss factor;

a third urethane layer disposed as a lower layer and exhibiting the damping characteristics of 0.2 or more in a damping ratio; and a tension imparting member layered on any of the above-described layers and imparting tension in the tangential direction.

In claim 14 of the present invention, provided is the seat structure according to claim 1, wherein the back cushioning member is designed to have a large deflection amount at the portion corresponding to the position in the vicinity of the scapula, and a small deflection amount at the position corresponding to the position in the vicinity of the acromion and/the lumber vertebra.

In claim 15 of the present invention, provided is the seat structure according to claim 14, wherein the deflection amount of the portion corresponding to the position in the vicinity of the scapula is in the range of 50 to 150 mm.

In claim 16 of the present invention, provided is the seat structure according to claim 14, wherein the spring constant in the vicinity of the equilibrium point of the portion corresponding to the position in the vicinity of the scapula is 15N/mm or less in load characteristic with a compression board of 20 mm in diameter, the spring constant in the vicinity of the equilibrium point of the portion corresponding to the position in the vicinity of the acromion is in the range of 0.2 to 2.0N/mm in load characteristic with a compression board of 50 mm in diameter, and the spring constant in the vicinity of the equilibrium point of the portion corresponding to the position in the vicinity of the lumber vertebra is in the range of 5N/mm or more in load characteristic with a compression board of 20 mm in diameter.

In claim 17 of the present invention, provided is the seat structure according to claim 1, wherein the back cushioning member is formed of a three-dimensional net member, and structured in a manner that frames supporting the three-dimensional net member deform when a large impact vibration or impact force equal to or more than predetermined is applied so that the tension of the three-dimensional net member is lowered.

In claim 18 of the present invention, provided is the seat structure according to claim 1, wherein the back cushioning member is formed with a tension structure with urethane provided with a two-dimensional tension structure and an urethane layer layered on the two-dimensional tension structure, and structured in a manner that frames supporting the tension structure with urethane deform when a large impact vibration or impact force equal to or more than predetermined is applied so that the tension of the tension structure with urethane is lowered.

In the present invention according to claim 1, at least one of the seat cushioning member and a back cushioning member has a structure in which tension along the tangential direction of the cushioning member is changed by difference in a strain energy of the tension structure formed from the elastic member caused in accordance to the magnitude of the excitation force to be an input. Through this structure, different damping characteristics can be exhibited according to the magnitude of the excitation force to be an input. If large damping characteristics function in the case of small excitation force, the inputted excitation force can not be relieved. However, according to the present invention utilizing the characteristics of tension field, since action of the damping characteristics is small for the input of small excitation force, and the spring characteristics of the seat cushioning member or the back cushioning member act relatively large, vibration relief can be possible. Meanwhile, an input vibrational energy having a large excitation force is converted to a strain energy of the tension structure formed from the elastic member and at the same time, tension in the tangential direction of the seat cushioning member or the back cushioning member is declined so that the energy can be scattered and lost by the action of the damping characteristics with relatively large damping ratio.

In the present invention according to claim 2, when small vibration having a small excitation force is inputted, small damping characteristics and relatively large spring characteristics act on one cushioning member out of the cushioning member provided on a seat cushion portion and/or the cushioning member provided on a seat back portion.

More in detail, there are mainly two spring constants on a plane, which are shown due to its tension structure. Among the two spring constants, the one having a softer spring constant, namely the one being easy to be elongated is put up along the back-and-forth direction in the seat cushion portion and along the up-and-down direction in the seat back portion. The boundary portion between the seat cushion portion and the seat back portion is pulled backward and fixed to the frame member. By setting in this way, due to bulging out of the seat cushion and seat back portions, these portions become free ends and the boundary portion is a fixed portion. Thus, a vibration system of an elastic member in which one end is fixed and the other end is free is obtained, so that the present invention can provide a structure which is given a tensile film vibration system, which is different from a conventional structure taking a seat structure as a vibration system having one degree of freedom as a whole. Accordingly, three different spring characteristics act in the up-and-down direction and in the back-and-forth direction in combination, so that the up-and-down vibration is converted to the back-and-forth vibration due to the strain energy of deformation by a plane wave caused by the tension structure of the elastic member. As a result, even if the spring constant in the normal direction with respect to the film is large, its natural frequency is small, so that the resonance range of a human body can be avoided. The excitation force inputted due to the phase difference caused by the interaction of these spring characteristics is damped.

On the other hand, when a large excitation force such as in the case of an impact force is inputted, large damping characteristics can be acted due to the conversion of the tension structure to the strain energy in at least one cushioning member out of these two described above. For instance, in a structure where such a large damping characteristic acts on the seat cushion portion, when a large impact vibration in the up-and-down direction with large deformation is received, a strain energy acting in the tangential direction of the tension structure becomes large owing to the above-described conversion function in the direction of the vibration to lower the tension in the tangential direction and reduce the impact vibration so that rebound of a human body can be suppressed. Further, for the vibration input in the back-and-forth direction, the relational displacement and the acceleration on the seat can be reduced due to restraint of a human body in the seat cushion portion and the seat back portion corresponding to the vicinity of the haunches. Furthermore, by adding the spring characteristics of the seat back portion, the damping ratio is adjusted to make the load dependency small so that the vibration energy is effectively absorbed. Still further, for a large input of the excitation force accompanying a very large displacement in the back-and-forth direction, due to phase difference between the back cushioning member and the seat cushioning member each having different characteristics from each other, displacement occurs in the back slant downward direction of a human body, so that an energy is scattered and lost by high damping characteristics due to the conversion to the strain energy in mainly seat cushion portion.

Similarly, when a structure is made in a manner that large damping characteristics act in the seat back portion, even if a large impact vibration is added in the back-and-forth direction at the collision or the like, rebound forward of a human body can be restrained, and by large damping characteristics, in particular, due to conversion to a strain energy acting on the back of a human body, rebound of a human body can be restrained.

In other words, in the present invention, an integral movement of the seat back and the seat cushion is created by restraining the seat cushion portion and the seat back portion, and the characteristics provided therein are made different from each other, and it is characterized in that a structure is made in which a function of converting the movement direction through phase difference generated by the above-described structure, a vibration damping function to convert a kinetic energy generated by combining different characteristics between the seat cushion portion and the seat back portion into a strain energy in the tangential direction of the tension structure of the elastic member, and vibration characteristics of the film are made available. Through this structure, for instance, when vibration having small amplitude such as vibration in high frequency zone, it can be relieved by the spring characteristics of the cushioning members or lateral vibration of the film, while for vibration with a large amplitude, a force with which a human body was pushed out from each cushioning member by large damping characteristics can be suppressed.

In the present invention according to claim 3 to claim 10, it has a camber-like shape, and since strain energies created by the bulging portion having the camber-like shape are different between the case of small excitation force and that of large excitation force, respective functions described above can be exhibited remarkably.

In the present invention according to claim 11 or claim 12, since two regions composed of a region where function of the spring characteristics is required to be high, and a region where function of the damping characteristics is required to be high can be made up in advance, the above-described respective functions can be exhibited more effectively.

In the present invention according to claim 13, the above-described respective functions can be exhibited by putting urethane materials having different characteristics in tiers in predetermined order.

In the present invention according to claim 14 to claim 16, each function described above can be more remarkably exhibited and at the same time can contribute to further improvement of riding comfort of the car.

In the present invention according to claim 17 or claim 18, when impact vibration or impact force larger than predetermined are received, rebounding of a human body can be further restrained by tension lowering of a human body.

BRIEF DESCRIPTION OF THE DRAWINGS

FIG. 1 is a schematic perspective view showing a seat structure relating to a first embodiment of the present invention;

FIGS. 6A, 6B, 6C, 6D and 6E are views showing examples of various arrangement manners of connecting fibers;

FIG. 8 is a Lissajous figure showing relations between relative displacements and forces when adding vibrations having 2.5 mm of amplitude in Example 1;

FIG. 12 is a Lissajous figure showing relations between relative displacements and forces when adding vibrations having 2.5 mm of amplitude in Comparison Example 1;

FIG. 17 is a view showing a damping wave form in Example 1;

FIG. 23 is a view showing respective vibration transmission characteristics of example 1, comparison 1 and comparison 2 measured with the seat cushioning member putting a weight of 20 kg thereon;

FIG. 24 is a view showing respective vibration transmission characteristics of example 1, comparison 1 and comparison 2 measured while a Japanese man (JM 64) of 64 kg in weight is taking a seat thereon;

FIG. 27 is a schematic perspective view showing a seat structure relating to a third embodiment of the present invention;

DETAILED DESCRIPTION OF THE PREFERRED EMBODIMENT(S)

Figure 2:
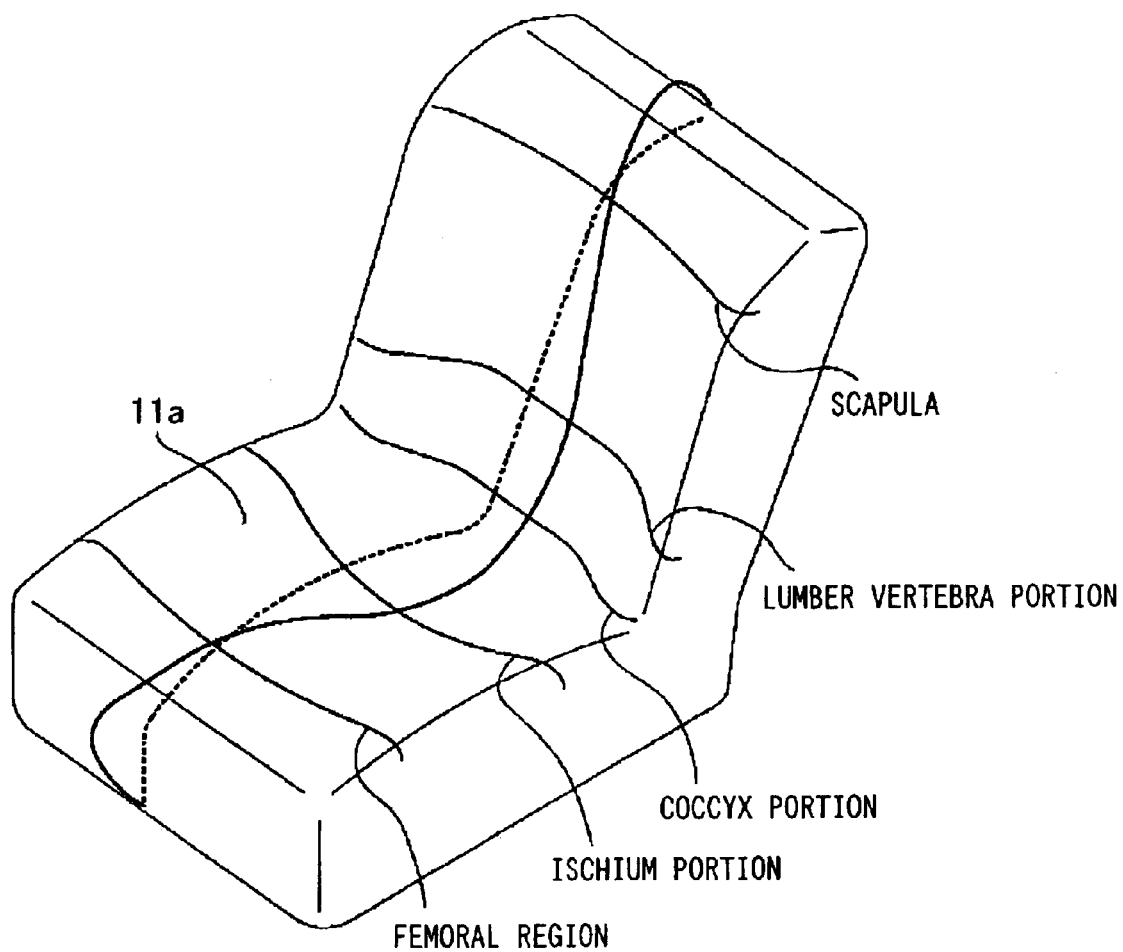
FIG. 2 is a view to explain a function of the seat structure relating the above embodiment.

Hereinafter, the present invention will be explained more in detail according to embodiments shown in the drawings.
(First Embodiment)

FIG. 1 is a schematic perspective view showing a seat structure 1 relating to the first embodiment of the present invention. As shown in the drawing, this embodiment takes a structure which provides a seat cushion portion 10 and a seat back portion 20, and forms a camber-like shape providing a bulging portion 11 which bulges out upward from a horizontal plane in the seat cushion portion 10. In concrete, members bent in an arch-like shape are used as side frames 12 and 13 opposing to each other in the width direction, and the structure is formed in such that a three-dimensional net member which forms a seat cushioning member 14 is put up between these side frames 12 and 13, with which a bulging portion 11 is formed.

Accordingly, a top portion 11a of the bulging portion 11 is to be formed at a position corresponding to a top portion of the side frames 12 and 13 formed in an arch-like shape. By forming the bulging portion 11 in such a manner, when taking seat, the top portion 11a of the bulging portion 11 shifts to be pushed out forward from coming into contact with a human body until the human body gets a balanced state and, as a result, the shape of the bulging portion 11 is deformed, as shown in FIG. 2, and the tension thereof is changed. Therefore, fitness feeling to fit easily to a human body is obtained due to the change of the tension. Furthermore, when a large excitation force is inputted, the haunches of a seated person are sunk in relatively so that it deforms in a manner that the position of the top portion 11a of the bulging portion 11 is further pushed out forwardly. At the same time, the back cushioning member 24 in the rear portion is also deformed so that a restoring force is generated by the back cushioning member 24. Through this formation, even in the case that the seat cushioning member 14 is put up between the side frames 12 and 13 at a predetermined tension, when a large excitation force is inputted, the input energy is scattered and lost by deformation of pushing out the top portion 11a of the bulging portion 11 forward and by a restoring force caused by the back cushioning member 24 without increase of the elasticity caused by increase of the tension. In other words, the present structure is a combination of the vibration characteristics of the film and the vibration characteristics having one degree of freedom. Incidentally, it is preferable that a node position where the amplitude is 0 is positioned at the center of gravity (tuber of ischium) of the seated person in a vibration mode.

In other words, in the present invention, a manner of deformation of the bulging portion 11 along the tangential direction due to shifting to push out the top portion 11a thereof in the back-and-forth direction in accordance with the magnitude of the excitation force to be inputted. As a result, tension generated in the tangential direction by a strain energy of the tension structure of the elastic member different in accordance with the excitation force can be changed so that the damping ratio acting at the time of small deformation is small and the damping ratio acting at the time of large deformation is large. In addition, the strain energy is changed according to the weight of the seated person (load mass). Therefore, in the case of different load mass, the tension generated by the strain energy at the time of seating can be adjusted to a state in accordance with the load mass, and the spring constant and the damping coefficient can be changed so that the above-described damping ratio created in accordance with the magnitude of the excitation force inputted can be exhibited without depending on the load mass, and damping characteristics without load mass dependency can be exhibited.

The top portion 11a of the bulging portion 11 is formed within a range capable of contacting with a human body at the position where such a function can be performed. It should be noted that it is preferable to provide the top portion 11a at a position ahead from the tuber of ischium of the seated person, seen from the side, within 100 mm or more forward from the boundary between the seat cushion portion 10 and the seat back portion 20. This is because the function of pushing out the top portion 11a forward acts more smoothly when the vicinity of the tuber of ischium is relatively sunk accompanied by inputting of the excitation force.

It is preferable to select the radius of the bulging portion 11 forming a camber shape in a range of 200 mm to 3000 mm radius according to the size of the seat. In the case of less than 200 mm of the radius, the height of the bulge at the top portion 11a of the bulging portion 11 is too high so that the seating comfort is damaged, and in the case of more than 3000 mm of the radius, the entire surface of the seat cushion portion becomes almost flat so that the characteristics of the present invention to change the damping characteristics by displacement of the bulging portion 11 become difficult to be exhibited.

The seat cushioning member 14 composed of the three-dimensional net member in the present embodiment, which is put up between the side frames 12 and 13, is put up at a rate of elongation in the width direction of 30% or less. When a three-dimensional net member is used as a cushioning member, conventionally, it has been necessary to put up at the rate of elongation of less than 5% especially in order that the damping characteristic is sufficiently functioned. However, in the present embodiment, since the cushioning member is formed to be a camber shape provided with the bulging portion 11 as described above, sufficient damping characteristics can be exhibited for an input of a large excitation force when the cushioning member is put up at the rate of elongation of 5% or more. Further, by putting up the cushioning member at the rate of elongation between 5% to 30%, there arises an advantage of reducing a feeling of something foreign of the side frames 12 and 13, and the like. It is needless to say that by taking the narrowest opposed distance of 380 mm or more between the side frames 12 and 13, the cushioning member can be put up at the rate of elongation of 0% to less than 5%, and in such the case, much larger damping force than ever can be functioned. Incidentally, since a feeling of something foreign of the side frames 12 and 13, and the like, differs not only according to the rate of elongation but also according to the thickness and the like of the three-dimensional net member used as the seat cushioning member 14 in either case, in order to further reduce such a feeling of something foreign, it is preferable to put a polyurethane foam material or other three-dimensional net member between the three-dimensional net member and the frame member such as side frames 12 and 13.

In the present embodiment, a three-dimensional net member is used for the cushioning member (the back cushioning member) 24 to form the seat back portion 20. The seat back portion 20 does not form the bulging portion at the position corresponding to that below the scapula, and as side frames 22 and 23, the front edge portion corresponding to the lumber vertebra to the vicinity of the scapula is substantially linear, and the upper portion than the position corresponding to the vicinity of the scapula, it shapes to curve backward in the range of about 200 mm to about 30 mm. Accordingly, a camber shape in which the vicinity of the scapula is taken as the top is formed at this portion.

The back cushioning member 24 composed of a three-dimensional net member is put up at the rate of elongation of 30% or less similarly to the above-described seat cushioning member 14 between the side frames 23 and 24. However, since the front edges of the side frames 22 and 23 are formed to curve backward at the upper portion in the range of about 200 mm to about 30 mm, when a large load is applied on the back cushioning member 24, as a figure line shown by a solid line along the vertically sectional direction in FIG. 2, upper portion of the back cushioning member 24 from the vicinity of the scapula is escaped so as to bulge out upward by the bending amount of the vicinity of the scapula backward so that the shape is changed. On the other hand, the portion corresponding to the lumber vertebra becomes a strong portion in elasticity along the back-and-forth direction. As a result, back load of the seated person is scattered efficiently so that a feeling of support is obtained by the portion corresponding to the lumber vertebra but the load can be damped at the upper portion from the vicinity of the scapula. In other words, it has a structure that realizes the elasticity and the damping property on the same plane.

The back cushioning member 24 becomes possible to bend largely at the vicinity of the scapula, so that when a large back-and-forth load is received, the entire back of a human body, in other words, the back of the portion from the lumber vertebra to the vicinity of the scapula almost keeps a posture at the time of seating to displace backward as it keeps the posture. Through this configuration, when a large back-and-forth load is received, by combining the damping characteristics of the back cushioning member 24 and the spring characteristics of the lumber vertebra, the damping ratio of the entire back of a human body is ensured so that a human body can be protected. If a structure in which the vicinity of the lumber vertebra is largely bent was taken, a human body would have been bent largely substantially like the letter V seen from the side. Further, since a degree of contribution of the spring characteristics becomes small so as to have load dependency, and damping function of the back cushioning member 24 to a human body differs according to a seated person, it becomes necessary to provide a structure to newly give a soft elasticity to the seat cushioning member, which makes the structure complicate.

Therefore, it is preferable that as the side frames 22 and 23 forming the seat back portion 20, a structure which has a small bulging of the lumber vertebra as described above, with a straight line or a curvature of a large deformation, and has a shape in which an upper portion from the vicinity of the scapula is bent backward is adopted, and as the back cushioning member 24, it is provided in such that the deflection amount of the portion corresponding to the vicinity of the scapula is large, and the deflection amount of the portion corresponding to the lumber vertebra is small by disposing the position of an upper frame 25 disposed between the upper ends of the side frames 22 and 23 to be rear. The deflection amount of the back cushioning member 24 in the vicinity of the scapula is preferably in the range of 50 mm to 150 mm. Further, in order to make the back cushioning member 24 have such a function, it is preferable to adjust the rate of elongation at the time of putting up the cushioning members in such a manner that in the vicinity of the scapula, 20 mm or more of the stroke to the equilibrium point can be ensured and the spring constant in the vicinity of the equilibrium point is load characteristics of 15N/mm or less when pressed with a compressed board having a diameter of 20 mm, and in the vicinity of the lumber vertebra, a stroke to the equilibrium point is 40 mm or less, and the spring constant in the vicinity of the equilibrium point is load characteristics of 5N/mm or more when pressed with a compressed board having a diameter of 20 mm.

Further, when it is structured to have a large deflection amount in the vicinity of the scapula, in order to make accumulative fatigue small against the excitation force inputted at the time of driving by suppressing vibration of the head portion, it is preferable to make the deflection amount of the portion corresponding to the vicinity of the acromion small compared with the deflection amount corresponding to the vicinity of the scapula, and it is preferable to set the stroke to the vicinity of the equilibrium point 30 mm or less. Furthermore, it is preferable to set the spring constant measured at the time of pressing with a compressed board having a diameter of 50 mm in the vicinity of the acromion at that time to be 0.2 to 2.0N/mm. By making the structure like this formation, the portion corresponding to the vicinity of the acromion serves as a point to substantially fix the head portion so as to suppress accumulative fatigue as described above, and at the same time, such a portion serves as a so-called acromion rest, trembling of the upper portion of a human body caused by yawing and rolling can be made small, and the moment, stress and load applied on the wrist taking a steering wheel become small. Therefore, it serves to take a steering wheel lightly with ease, and to reduce the wheel holding fatigue.

It is possible to form the seat cushioning member 14 and the back cushioning member 24 separately and to put up to each frame to compose the seat cushion portion 10 and the seat back portion 20 independently, but in order to enhance the holding property from the haunch portion to the waist portion of a human body, and to enhance the damping property when vibration with a large amplitude is inputted and to absorb vibration and to move the pelvis and the thoracic vertebra at the same phase, it is preferable to form integrally. In this case, it is possible to form the seat cushioning member 14 and the back cushioning member 24 by using one sheet of a three-dimensional net member, or both may be formed separately and integrate together by stitching together the seat back portion of the seat cushioning member 14 with the lower portion of the back cushioning member 24.

It should be noted that the cushioning structure of the present embodiment which is composed of the seat cushioning member 14 and the back cushioning member 24 form a tension structure by putting up to each frame as described above, and the vicinity of the boundary portion thereof is provided by pulling backward and fixed to any frame. Accordingly, the vicinity of the boundary portion may become the fixed end of the vibration system, and the top portion of the bulging portion 11 which creates a camber shape as described above and the portion along the rear portion in the back cushioning member 24 may form the free ends of the vibration system deformable freely in accordance with the load of the seated person and the excitation force to be the input. As a result, as described above, change in the tension of the tension structure in the tangential direction by the strain energy can be created.

Further, it is preferable to put up the cushioning member so as to arrange the spring characteristics easy to function on the portion under the tuber of ischium or in the vicinity of the lumber vertebra of a seated person, and easy to deform in the tangential direction by the strain energy of the tension structure from the bulging portion 11 to the vicinity of the front edge portion or along the rear of the seat back portion, which form a camber shape. Therefore, even when putting up at a rate of elongation of 30% or less as described above, it is preferable to put up so as to obtain different rate of elongation according to portions. Thus, it is preferable to set the percentage of elongation especially under the tuber of ischium or in the vicinity of the lumber vertebra relatively high and for other portions, for instance, from the bulging portion 11 to the vicinity of the front edge portion or along the rear of the seat back portion, which form a camber shape, it is preferable to put up at a relatively low percentage of elongation.

Figure 3:
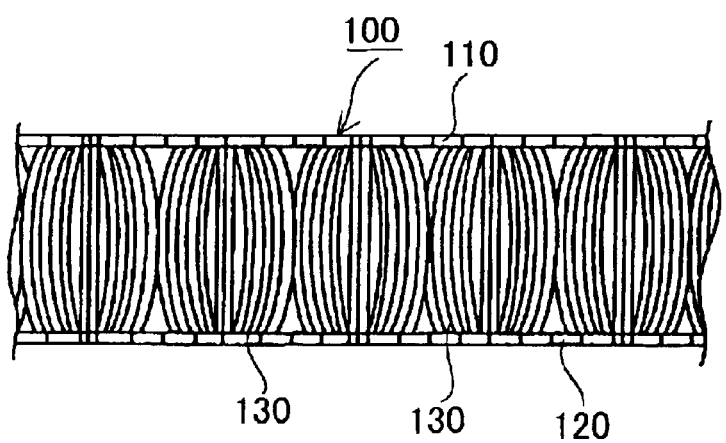
FIG. 3 is a cross sectional view showing an example of configuration of a three-dimensional net member available in the above embodiment.

Here, a structure of a three-dimensional net member forming the seat cushioning member 14 and the back cushioning member 24 described above will be explained. The three-dimensional net member is formed by connecting a pair of ground fabrics disposed apart from each other with connecting fibers. More concretely, as shown in FIG. 3, a three-dimensional net member 100 is structured of a solid three-dimensional structure including a pair of ground fabrics 110 and 120 disposed apart from each other and a lot of connecting fibers 130 connecting between the pair of ground fabrics 110 and 120.

Figure 4:
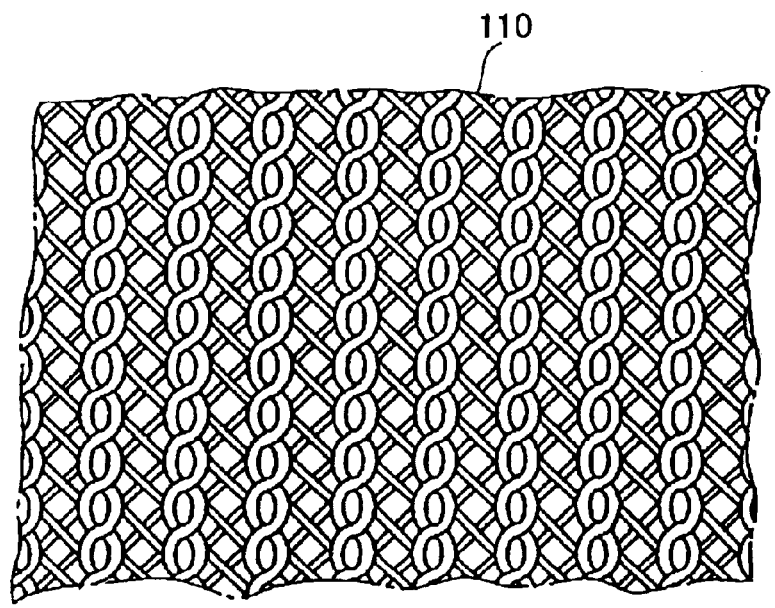
FIG. 4 is a view showing an example of one of ground knitted fabrics.
Figure 5:
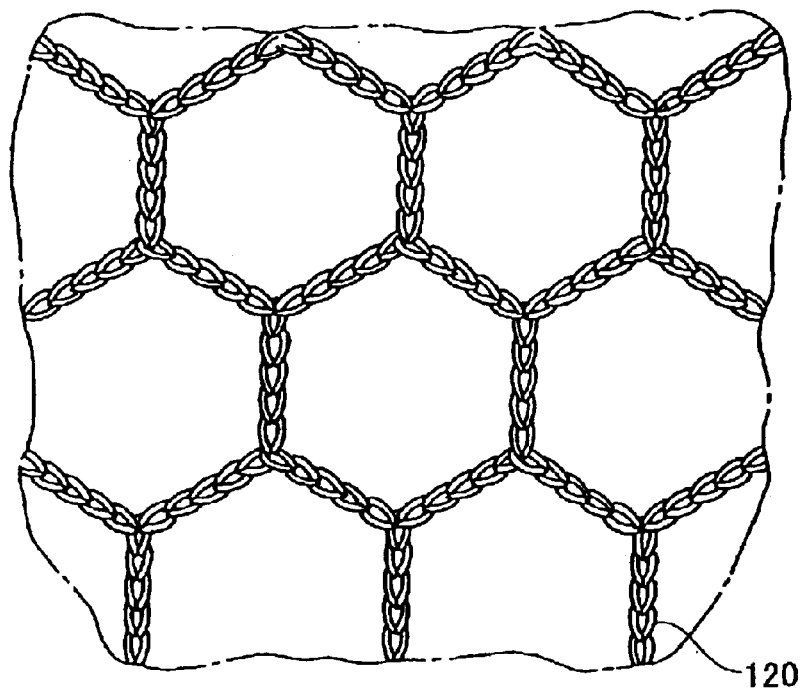
FIG. 5 is a view showing an example of the other ground knitted fabric.

One of the ground knitted fabrics 110 is formed with a flat knitted fabric structure (small mesh) structured with yarns made of twisted monofilaments continuing to any directions in both wale direction and course direction as shown in FIG. 4, for example. On the other hand, the other ground knitted fabric 120 is formed in a larger stitch structure than that of the ground knitted fabric 110 including a honey comb-like (hexagon) mesh made of twisted monofilaments, as shown in FIG. 5 for example. Needless to say, this knitted fabric structure is just an example, and it is possible to adopt knitted fabric structures other than the small mesh structure and the honey comb structure. The connecting fibers 130 are knitted between the pair of ground knitted fabrics 110 and 120 to keep a predetermined distance between one of the ground knitted fabrics 110 and the other ground knitted fabric 120 so that a predetermined stiffness is given to the three-dimensional net member 100 which is a solid mesh knitting.

The thickness of the ground fiber forming the ground knitted fabrics 110 and 120 and the like is selected from that which can provide firmness in structure required for a solid knitted fabric and being in the range not to give difficulty in a formation work. As a ground fiber, a monofilament can be used, but it is preferable to use a multifilament or a spun yarn from the point of view such as feeling, softness in surface touch and so on.

It is preferable to use a monofilament as a connecting fiber 130, and it is suitable to use the one having thickness in the range of 167 to 1100 decitex. This is because a cushioning property having a favorable restoring force can not be given by the multifilament, and when the thickness becomes lower than 167 decitex, it becomes difficult to obtain suitable firmness in structure. When it becomes more than 1100 decitex, it becomes too hard to obtain a suitable elasticity. In other words, adoption of the monofilament having the above-described range as a connecting fiber 130, makes it possible to support the load of a seated person by deformation of the stitch structure composing respective ground knitted fabrics 110 and 120 and deformation (falling down and buckling) of the connecting fiber 130, and by restoring force of adjacent connecting fibers 130 giving spring characteristics to the deformed connecting fiber 130, so that a soft structure having soft spring characteristics without occurring of stress concentration can be realized. In addition to that, a damping force can be exhibited by rubbing the connecting fibers 130 against each other.

As a material for the ground fiber or the connecting fiber 130, it is not limited to some special material and, for instance, synthetic fiber, or regenerated fiber such as polypropylene, polyester, polyamide, polyacrylonitrile, and rayon or natural fiber such as wool, silk, cotton and so on can be cited. The above material can be used alone or can be used as any combination thereof. It is preferable to use thermoplastic polyester fibers such as polyethylene terephthalate (PET), and polybutylene terephthalate (PBT), polyamide fibers such as nylon 6 and nylon 66, polyolefine fibers such as polyethylene and polypropylene, or a combination of two or more kinds of these fibers. Incidentally, polyester fibers is suitable because of its regenerative property. It should be noted that the shape of fibers used for the ground fiber or the connecting fiber 130 is not limited, and a round cross-sectional fiber, a modified cross-sectional fiber and so on can be used.

As for the manner of arranging the connecting fibers 130 (pile structure), when the connecting fiber 130 connecting respective ground knitted fabrics 110 and 120 are expressed from states seen from the side, more concretely, they are classified in the types shown in FIG. 6A to FIG. 6E. FIG. 6A, FIG. 6B are a straight type in which the connecting fibers 130 are knitted almost vertically between the ground knitted fabrics 110 and 120, FIG. 6A is the one knitted straight in the shape of the letter 8, and FIG. 6B is the one knitted simply straight. FIG. 6C to FIG. 6E are a cross type in which the connecting fibers 130 are knitted to cross each other on the way between the ground knitted fabrics 110 and 120. Among these, FIG. 6C is the one knitted to cross the fibers in the letter of 8, FIG. 6D is the one knitted in a cross simply, and FIG. 6E is the one knitted two fibers together in cross (double cross). It should be noted that, as shown in FIG. 6C to FIG. 6E, when the connecting fibers 130 are disposed slantwise in a cross with each other, it is possible to give a soft spring characteristic having large compressibility while keeping a sufficient restoring force due to buckling strength of respective connecting fibers 130 compared with the pattern in which the connecting fibers 130 are disposed almost vertically between the ground knitted fabrics 110 and 120 (refer to FIG. 6A and FIG. 6B).

TEST EXAMPLE 1

Example 1

Figure 7:
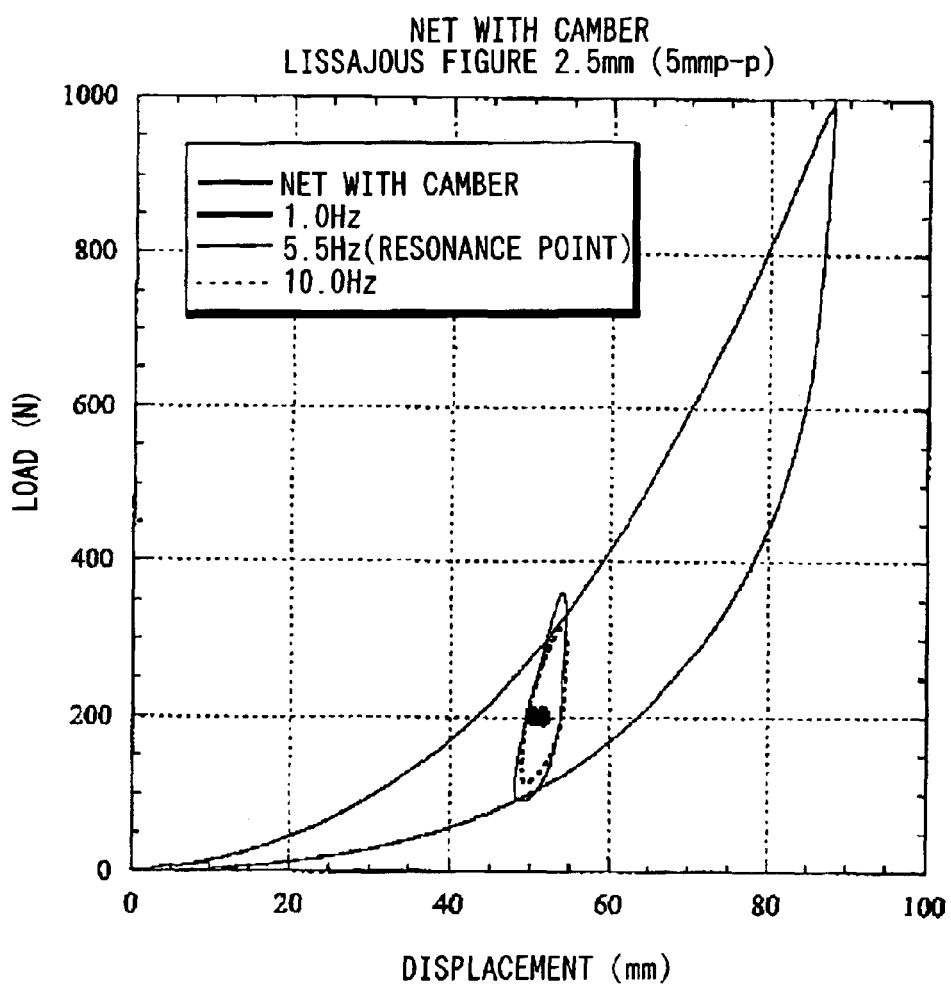
FIG. 7 is a view of Lissajous figures putting on top of each other showing relations between relative displacements and forces when adding vibrations having 2.5 mm of amplitude to load and displacement characteristics in example 1.

For the seat structure 1 having a structure shown in FIG. 1, the seat cushioning member 14 (NET with a camber), arranging the center to the position of 100 mm (corresponding to an average position of the tuber of ischium of Japanese adults) in front from the rear portion (a boundary portion between the seat cushioning member 14 and the back cushioning member 24) is pressed to 1000N at a speed of 50 mm/min with a compression board having a diameter of 200 mm, and static load characteristics are measured. The result is shown in FIG. 7. Note that the characteristics of the three-dimensional net member used here are as shown in the next table. Incidentally, it is put up at the rate of elongation of 6 to 8% between the side frames 12 and 13.

TABLE 1

| Item Number | | 09030D |
|---|---|---|
| Weight (g/m$^2$) | | 580 |
| Thickness (mm) | | 3.91 |
| Tensile Strength | Longitudinal | 124.8 |
| (kg/50 mm) | Lateral | 71.6 |
| Rate of elongation (%) | Longitudinal | 54.8 |
| | Lateral | 102.7 |
| Tearing Strength (kg) | Longitudinal | 91.4 |
| | Lateral | 52.0 |
| Surface Wearability | Longitudinal | 4–5 |
| (Class) | Lateral | 4–5 |
| Compressibility (%) | | 46.8 |
| Elastic modulus (%) | | 99.5 |
| Constant-Load Elongation | Longitudinal | 15.4 |
| (%) | Lateral | 60.6 |
| Residual Elongation (%) | Longitudinal | 0.8 |
| | Lateral | 12.5 |
| Modulus (%) | Longitudinal 50 kg | 25.3 |
| | Lateral 50 kg | 90.0 |
| | Longitudinal 75 kg | 33.7 |
| | Lateral 75 kg | — |
| | Longitudinal 100 kg | 43.7 |
| | Lateral 100 kg | — |

A Lissajous figure showing relation between a relative displacement amount of the three-dimensional net member and a force when a load mass of 20 kg is mounted on the seat cushioning member 14 in FIG. 1 at an amplitude of 2.5 mm (distance between peaks 5 mm p-p) and vibration is applied thereon is shown in FIG. 8. In addition, the Lissajous figure in FIG. 8 is overlapped and shown adjusting the datum point to 196N on the load-displacement characteristics showing the static characteristic in FIG. 7.

Figure 9:
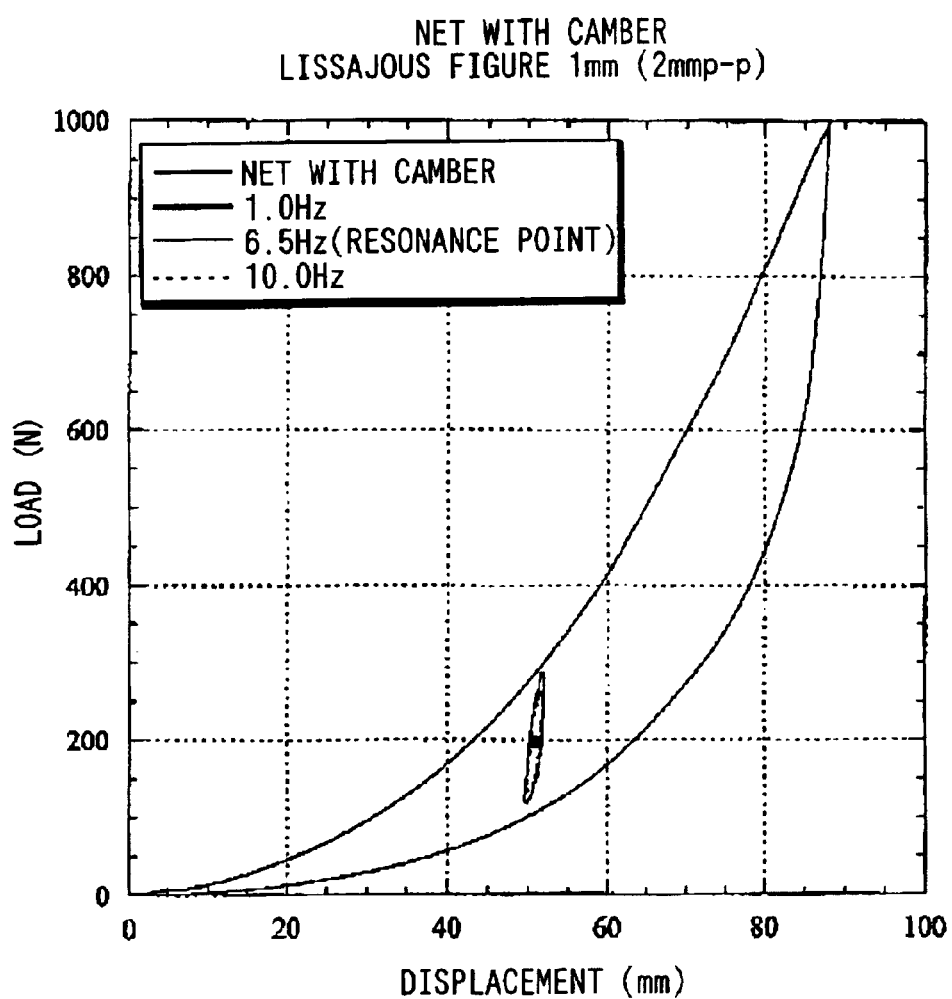
FIG. 9 is a view of Lissajous figures putting on top of each other showing relations between relative displacements and forces when adding vibrations having 1 mm of amplitude to load and displacement characteristics in Example 1.
Figure 10:
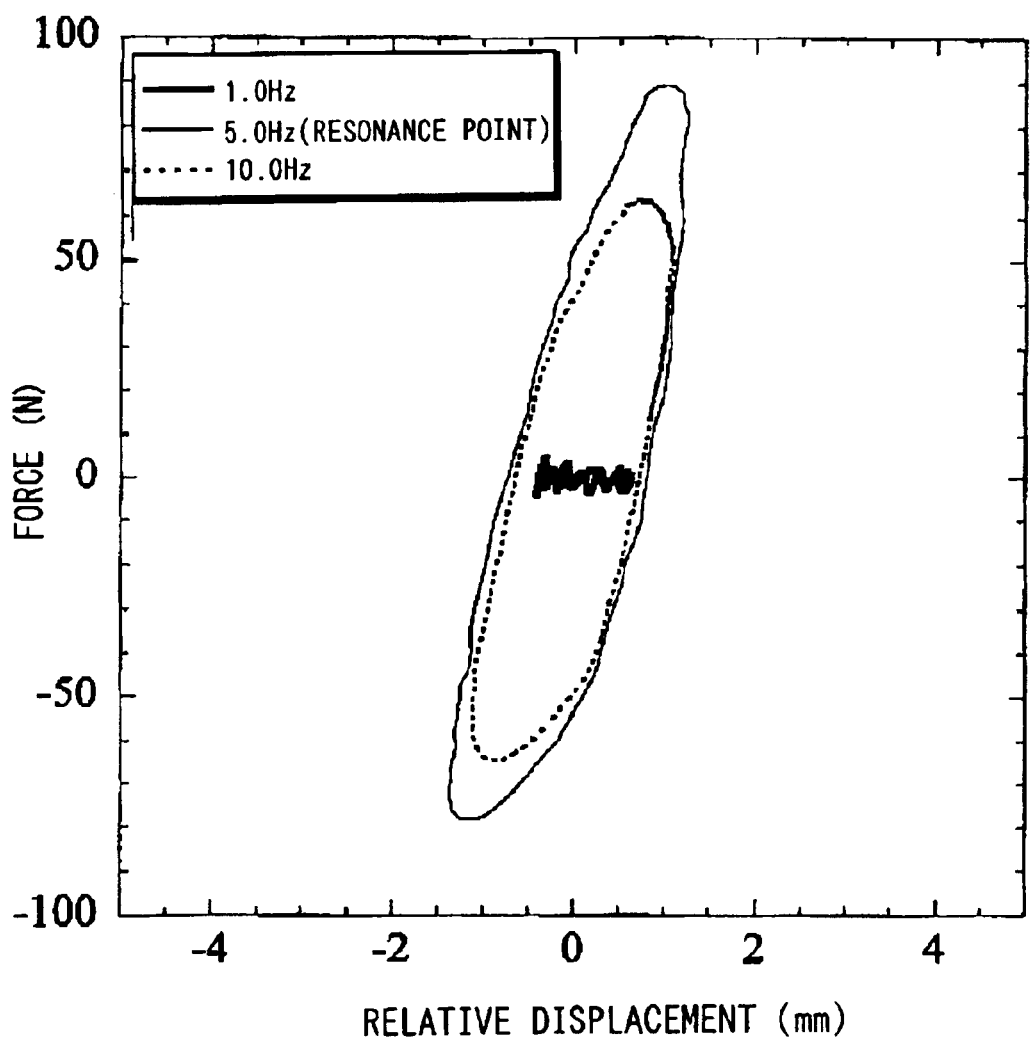
FIG. 10 is a Lissajous figure showing relations between relative displacements and forces when adding vibrations having 1 mm of amplitude in Example 1.

On the other hand, FIG. 10 is a Lissajous figure showing relation between a relative displacement amount of the three-dimensional net member and a force when vibration is applied at an amplitude of 1 mm (distance between peaks 2 mm p—p), and FIG. 9 shows the Lissajous figure overlapped on the figure of the load-displacement characteristics similar to FIG. 7.

Comparison Example 1

Figure 11:
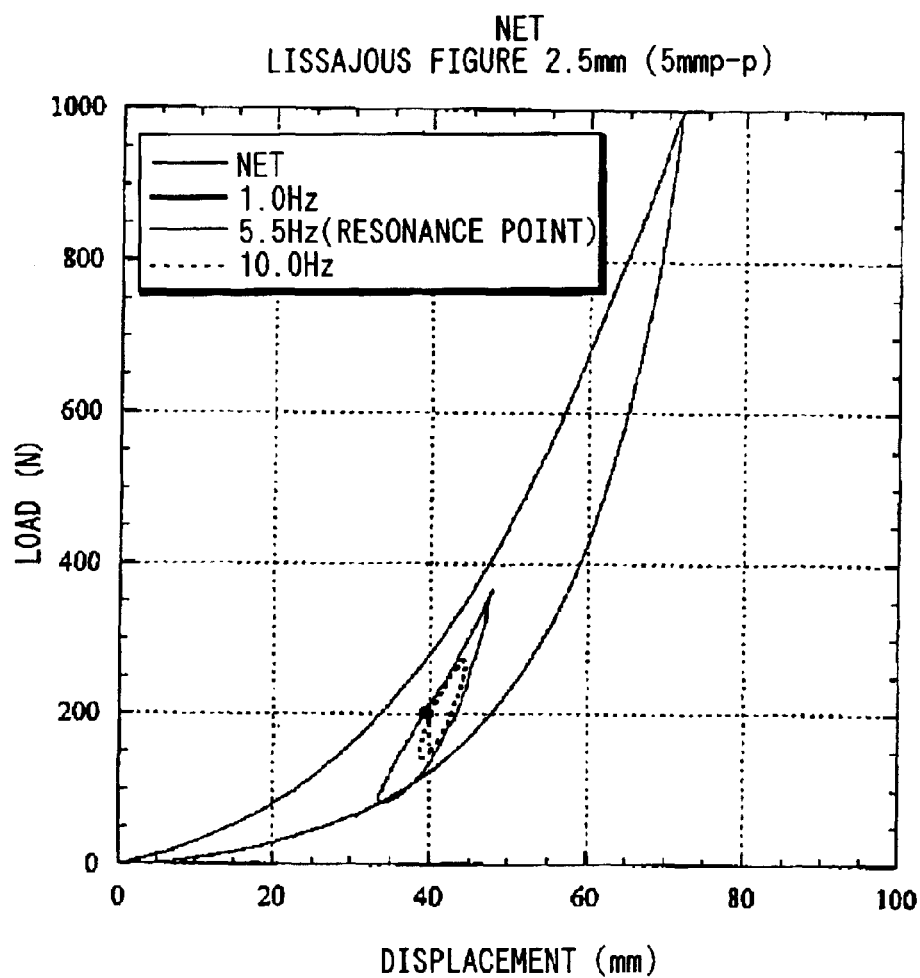
FIG. 11 is a view of Lissajous figures putting on top of each other showing relations between relative displacements and forces when adding vibrations having 2.5 mm of amplitude to load and displacement characteristics in Comparison Example 1.
Figure 13:
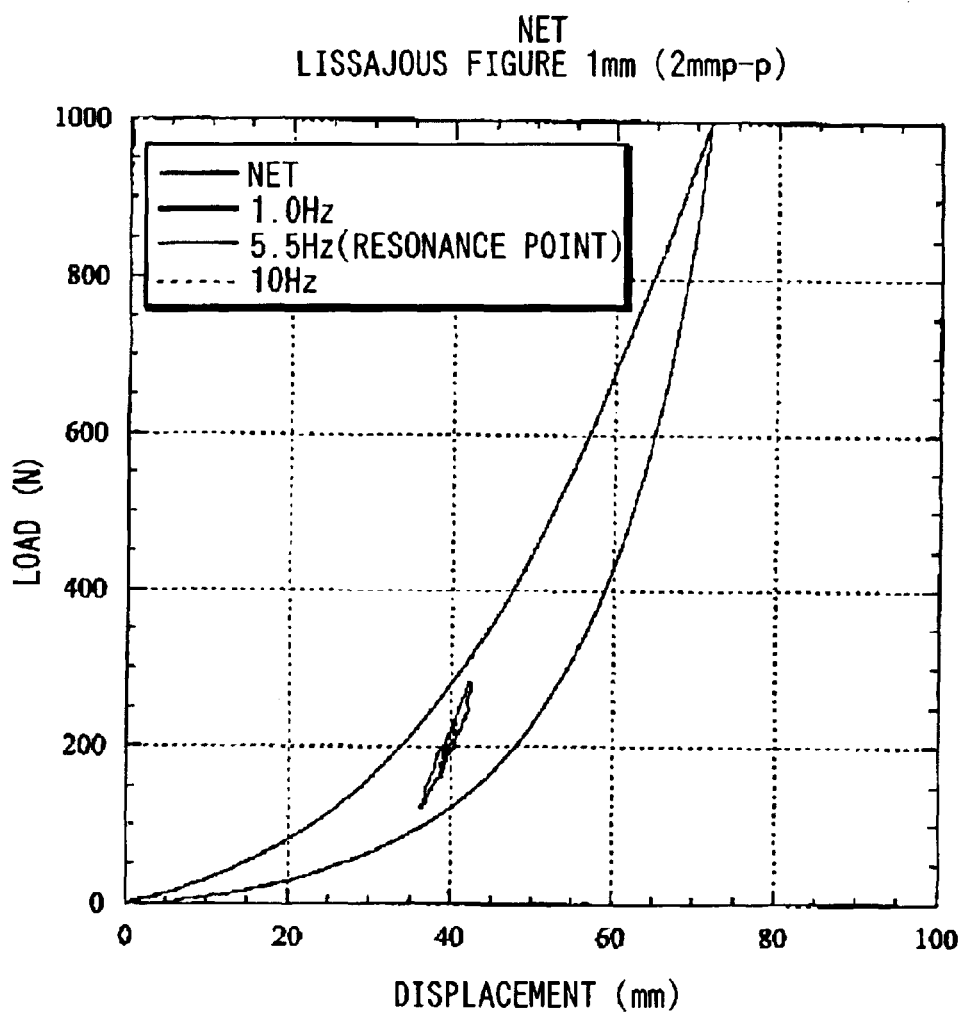
FIG. 13 is a view of Lissajous figures putting on top of each other showing relations between relative displacements and forces when adding vibrations having 1 mm of amplitude to load and displacement characteristics in Comparison Example 1.
Figure 14:
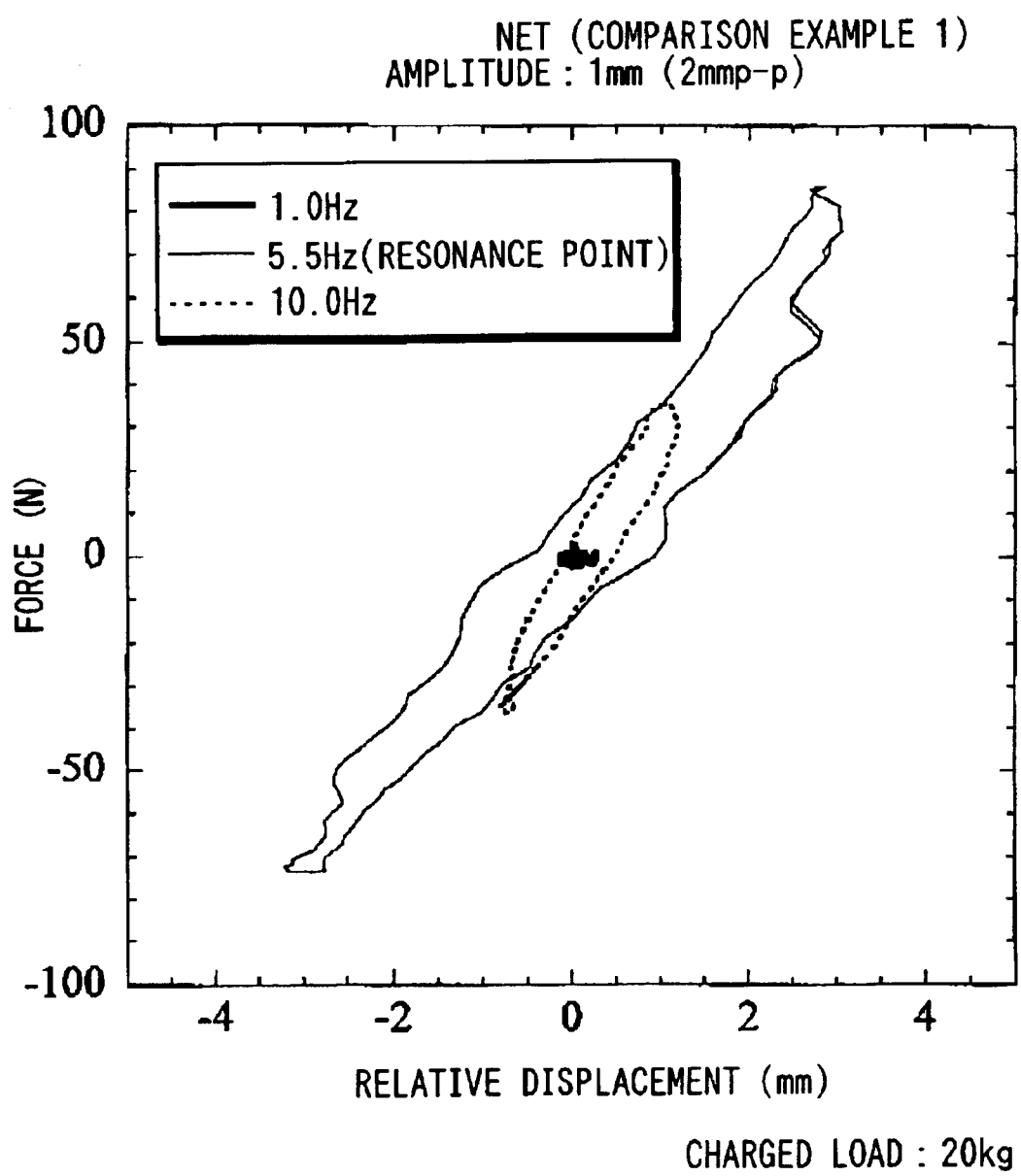
FIG. 14 is a Lissajous figure showing relations between relative displacements and forces when adding vibrations having 1 mm of amplitude in Comparison Example 1.

The seat cushion portion (NET) having the same seat structure as the seat structure of Example 1 except that the bulging portion 11 is not formed is pressed to 1000N at a speed of 50 mm/min with a compression board having a diameter of 200 mm and static load characteristics are measured, and similarly to Example 1, Lissajous figures showing relation between a relative displacement amount and a force at amplitudes of 2.5 mm (distance between peaks 5 mm p—p) and 1 mm (distance between peaks 2 mm p—p) are shown in FIG. 12 and FIG. 14. Further, these Lissajous figures are overlapped on the load-displacement characteristics figures in FIG. 11 and FIG. 13.

Comparison Example 2

Figure 15:
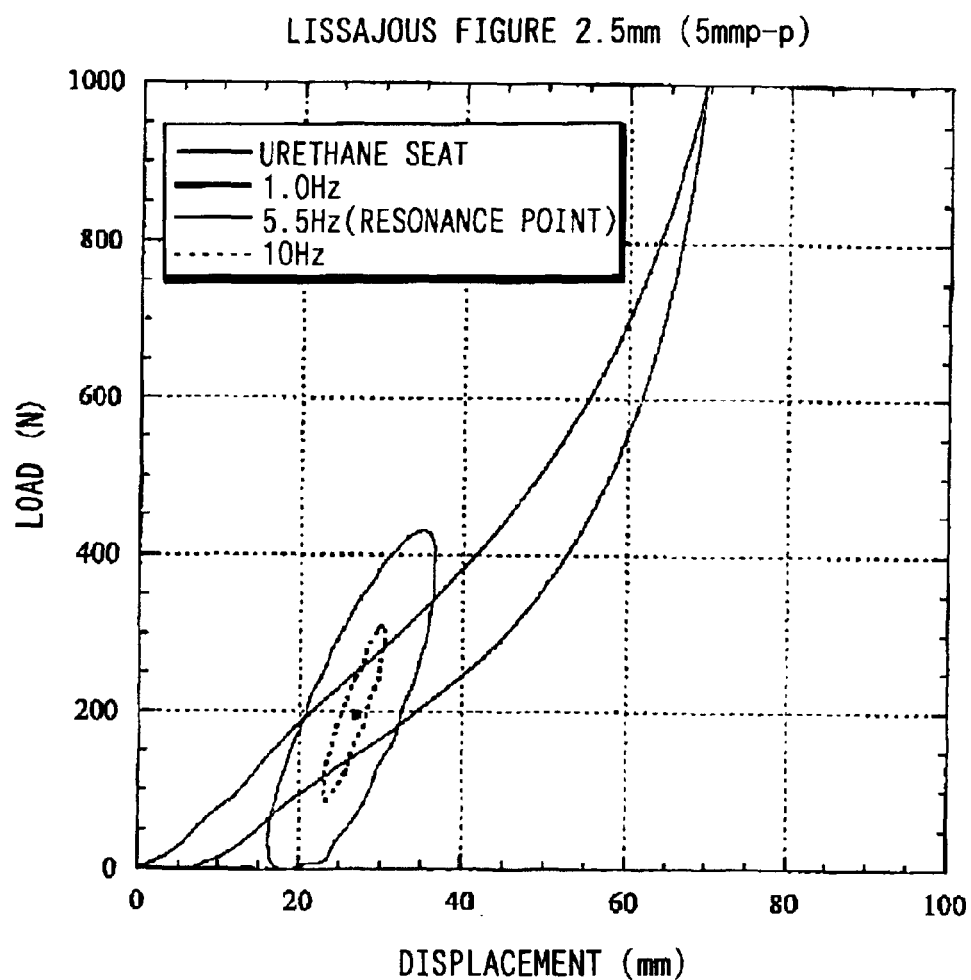
FIG. 15 is a view of Lissajous figures putting on top of each other showing relations between relative displacements and forces when adding vibrations having 2.5 mm of amplitude to load and displacement characteristics in Comparison Example 2.
Figure 16:
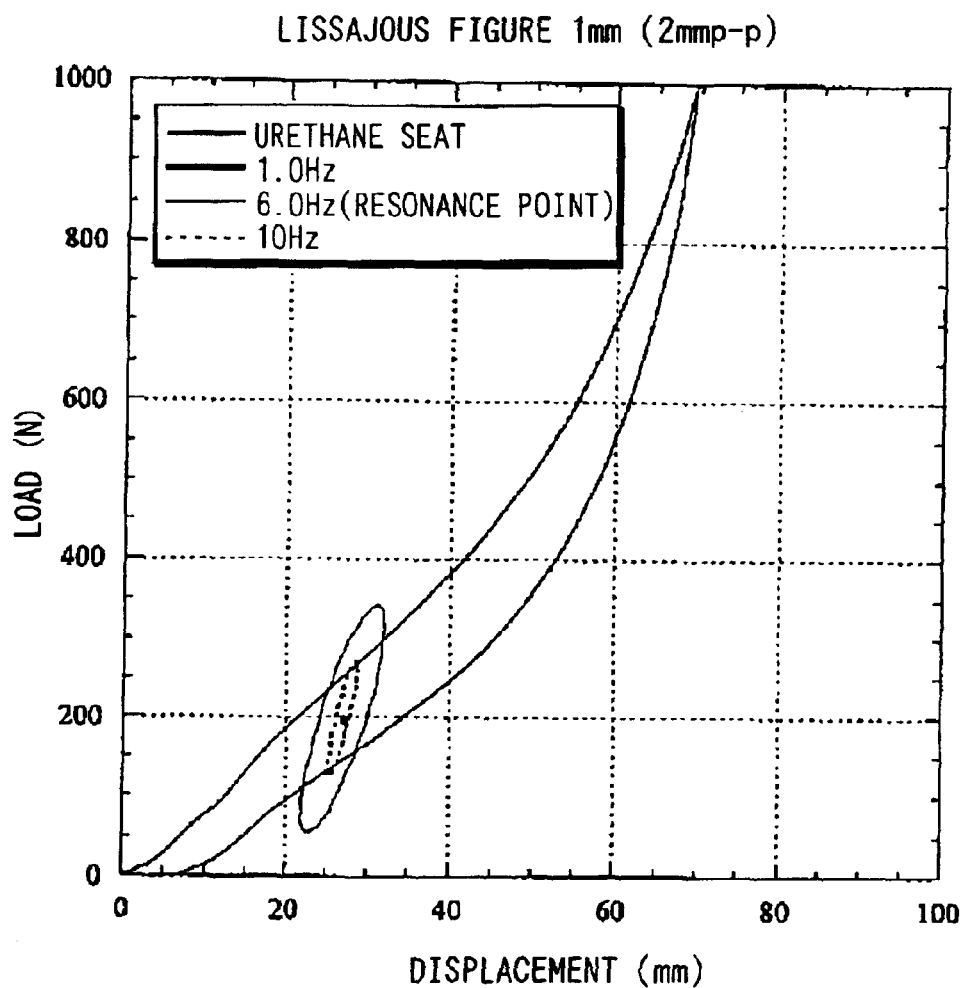
FIG. 16 is a Lissajous figure showing relations between relative displacements and forces when adding vibrations having 1 mm of amplitude in Comparison Example 2.

A seat structure (urethane seat) in which a cushioning member made of polyurethane foam of 100 mm in thickness is disposed both in the seat cushion portion and seat back portion is measured in the same manner as Example 1 and Comparison Example 1 and Lissajous figures showing relation between a relative displacement amount and a force at amplitude of 2.5 mm (distance between peaks 5 mm p—p) and 1 mm (distance between peaks 2 mm p—p) are overlapped on the load-displacement characteristics figures in FIG. 15 and FIG. 16.

From these results, in the case of Example 1 and Comparison Example 1, the Lissajous figures are almost within the curves of go (load on) and back (load off) on the static load characteristics at any amplitude, and show no large resonance characteristic. In the case of Comparison Example 2, the Lissajous figures are out of the area drawn by the curves of go and back on the static load characteristics at any amplitude. The force in the Lissajous figure is a force to be transferred to a human body accompanied by inputted vibration, and the fact that the force is far jumped out from the area of curves on the static load characteristics means that resonance is created in a low frequency area and absorbency of inputted vibration is low. Further, the fact that a force more than 1.2 to 1.3 G is added upward means that load mass separates from the cushioning member. Through this, it is understood that when a three-dimensional net member is used for a cushioning member as in Example 1 and Comparison Example 1, it is more excellent in vibration absorption characteristics than the case when polyurethane foam is used as the cushioning member.

On the other hand, when Example 1 is compared with Comparison Example 1, as clear from the Lissajous figures, the relative displacement amount and the force become small in Example 1, and it becomes clear that in the seat structure in Example 1, through formation of a camber shape having the bulging portion 11, tension in the tangential direction is changed by a stain energy created by the vibration inputted in the vertical direction, and the input vibration can be scattered efficiently in the back-and-forth direction and absorbed. Especially, the displacement amount in Example 1 in the vicinity of 5 Hz which is a resonance frequency swinging the skeletal structure of a human body, and which affects the riding comfort of the car greatly, becomes prominently small compared with that in Comparison 1, which shows that resonance is hard to occur. However, the present example shows the riding comfort of the car felt by a person corresponding to a Japanese man at the age of 7 with an average weight of 25 kg, and the present invention can be applied to a child seat which is small in load mass, which shows that it is applicable by adjusting the tension field. Further, when compared among groups of a small input vibration in excitation force having a small amplitude of 2 mm p—p, the one in Example 1 is small in displacement amount, which shows that the vibration relief property having a small amplitude is high owing to the spring characteristics of a tensile elastic member. Further, when compared groups of a large input vibration in excitation force having a large amplitude of 5 mm p—p, Example 1 is small in both displacement amount and force, which shows that a high damping property is exhibited.

TEST EXAMPLE 2

Figure 18:
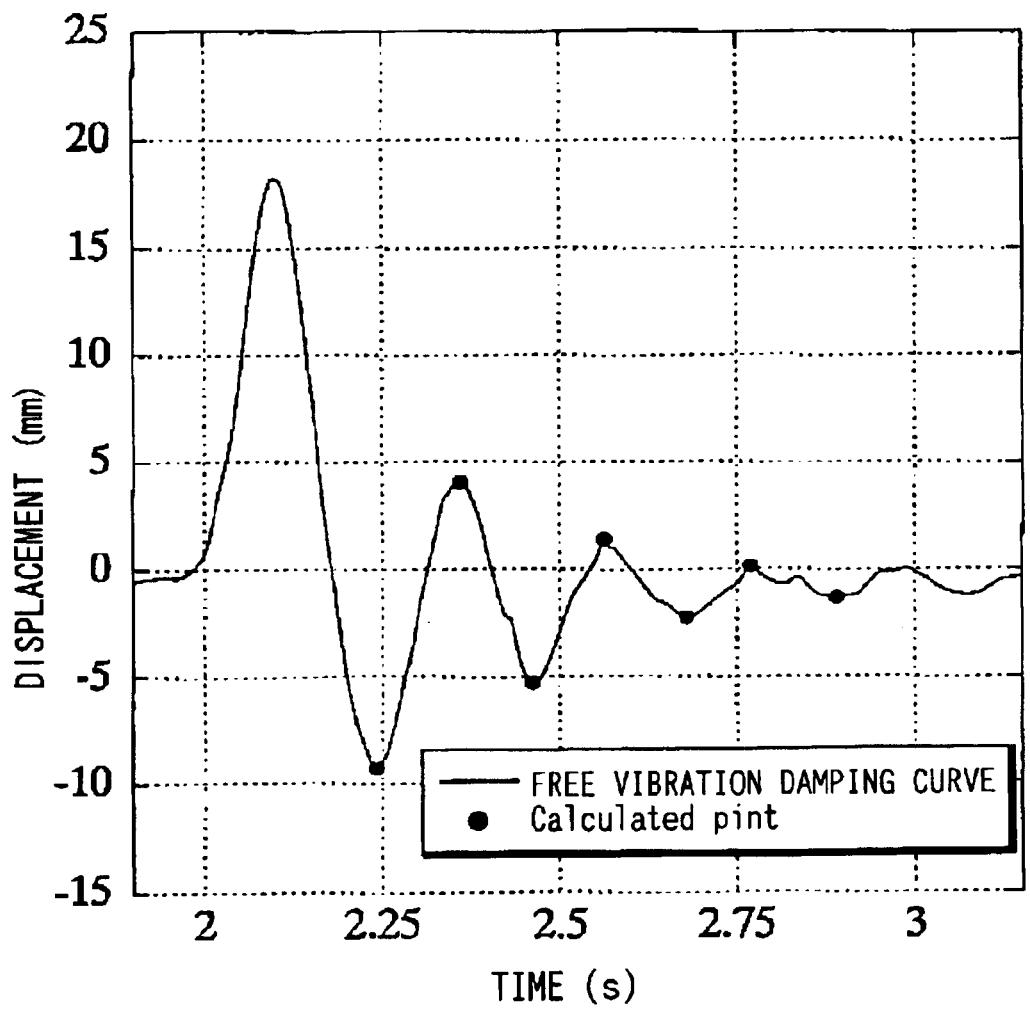
FIG. 18 is a view showing a damping wave form in Comparison Example 1.
Figure 19:
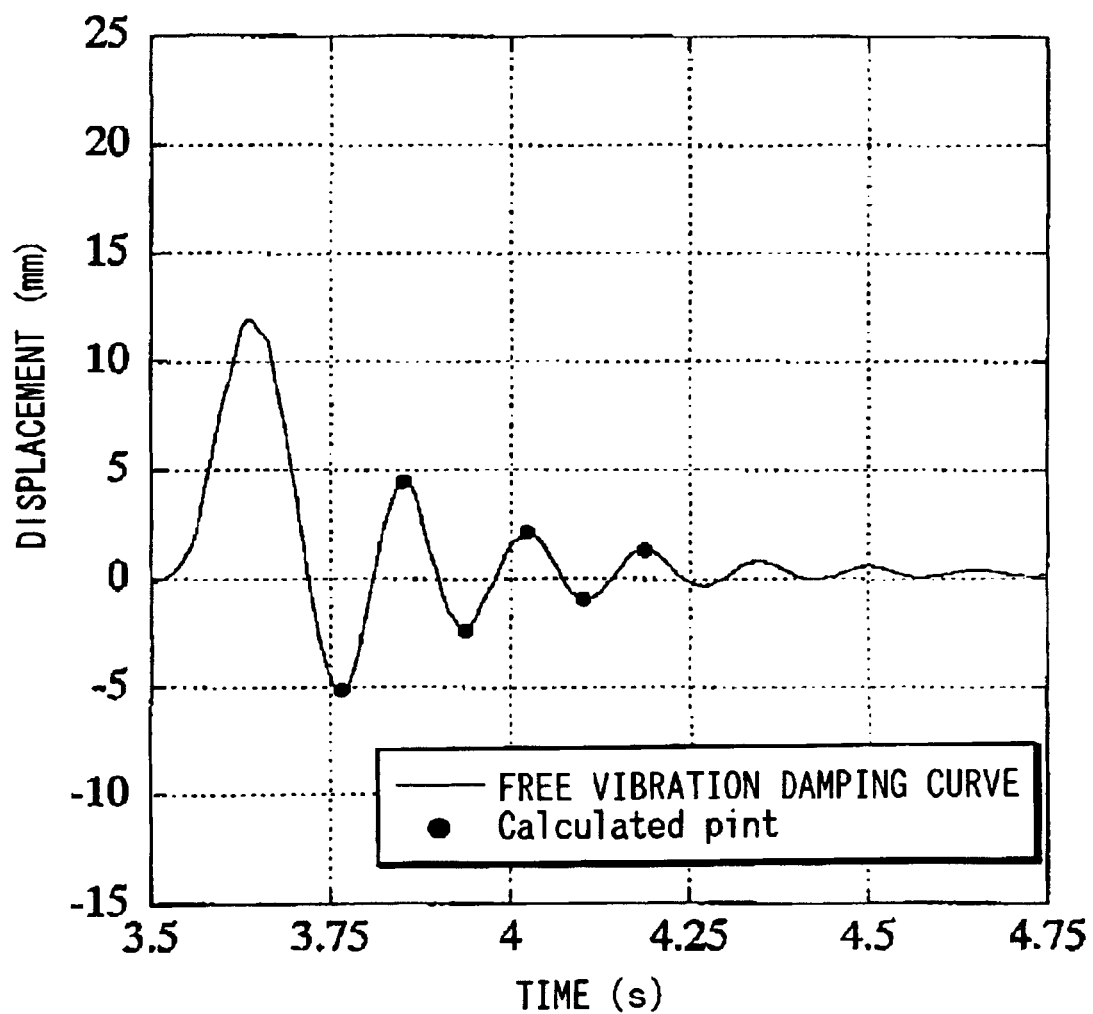
FIG. 19 is a view showing a damping wave form in Comparison Example 2.
Figure 20:
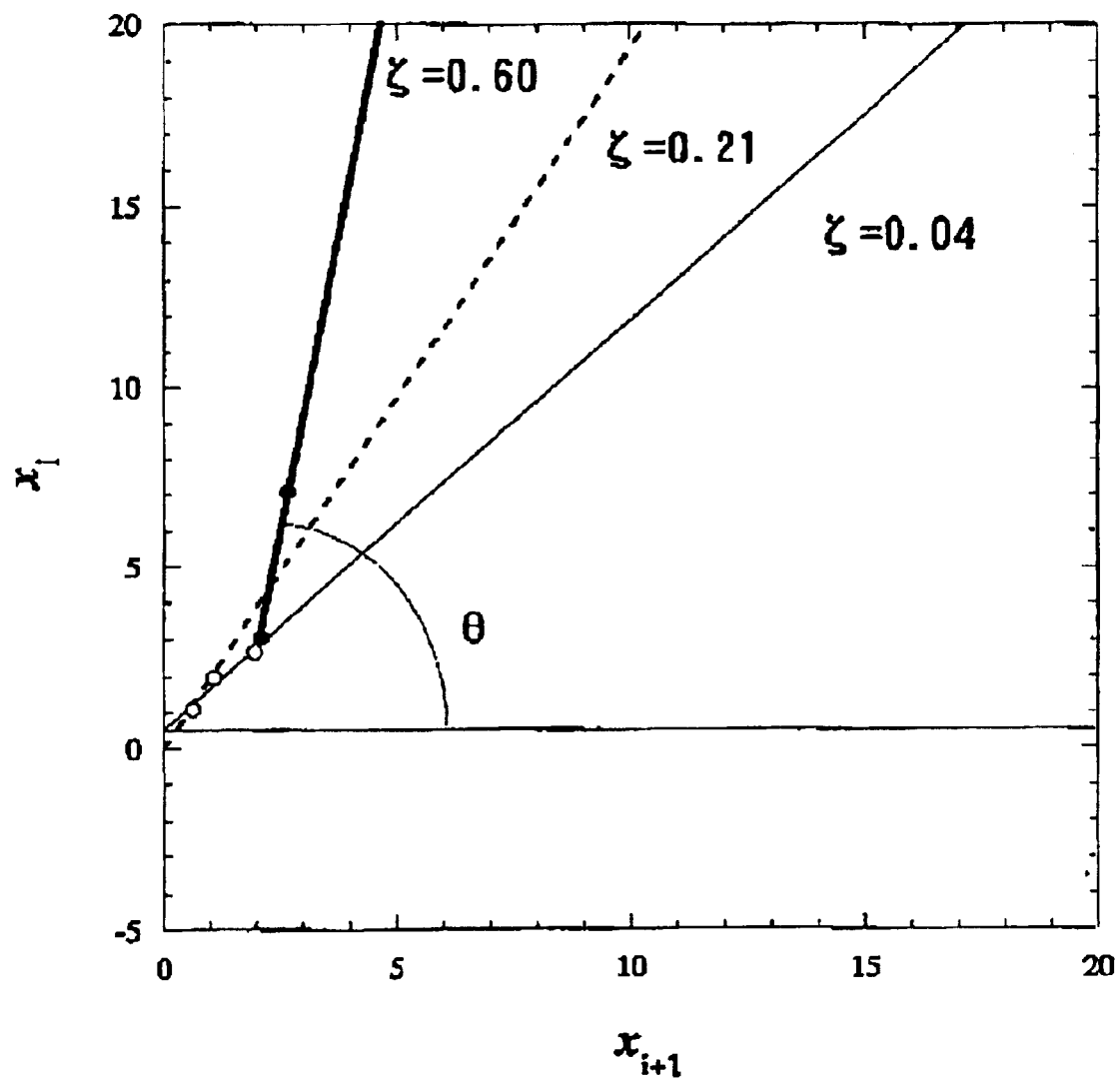
FIG. 20 is a view showing a damping ratio in Example 1.
Figure 21:
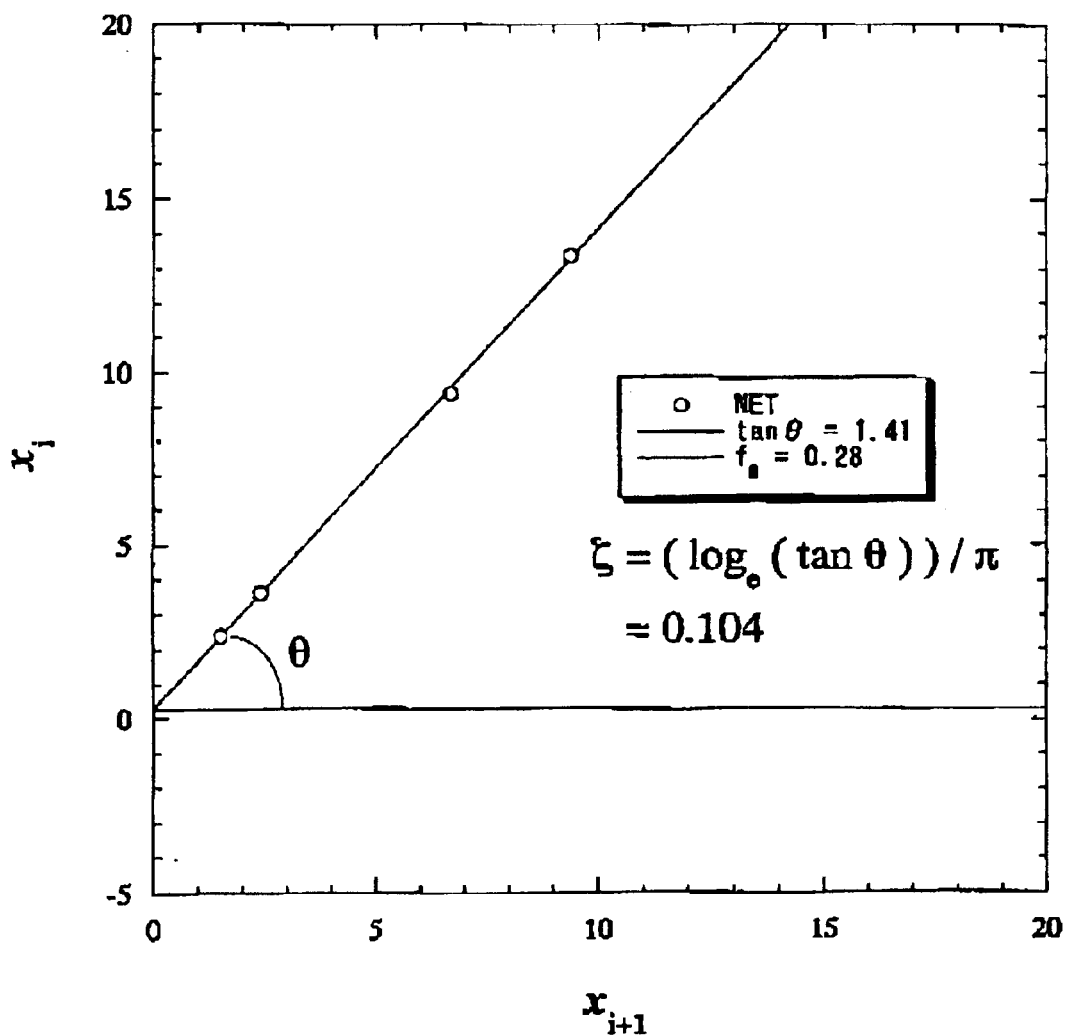
FIG. 21 is a view showing a damping ratio in Comparison Example 1.
Figure 22:
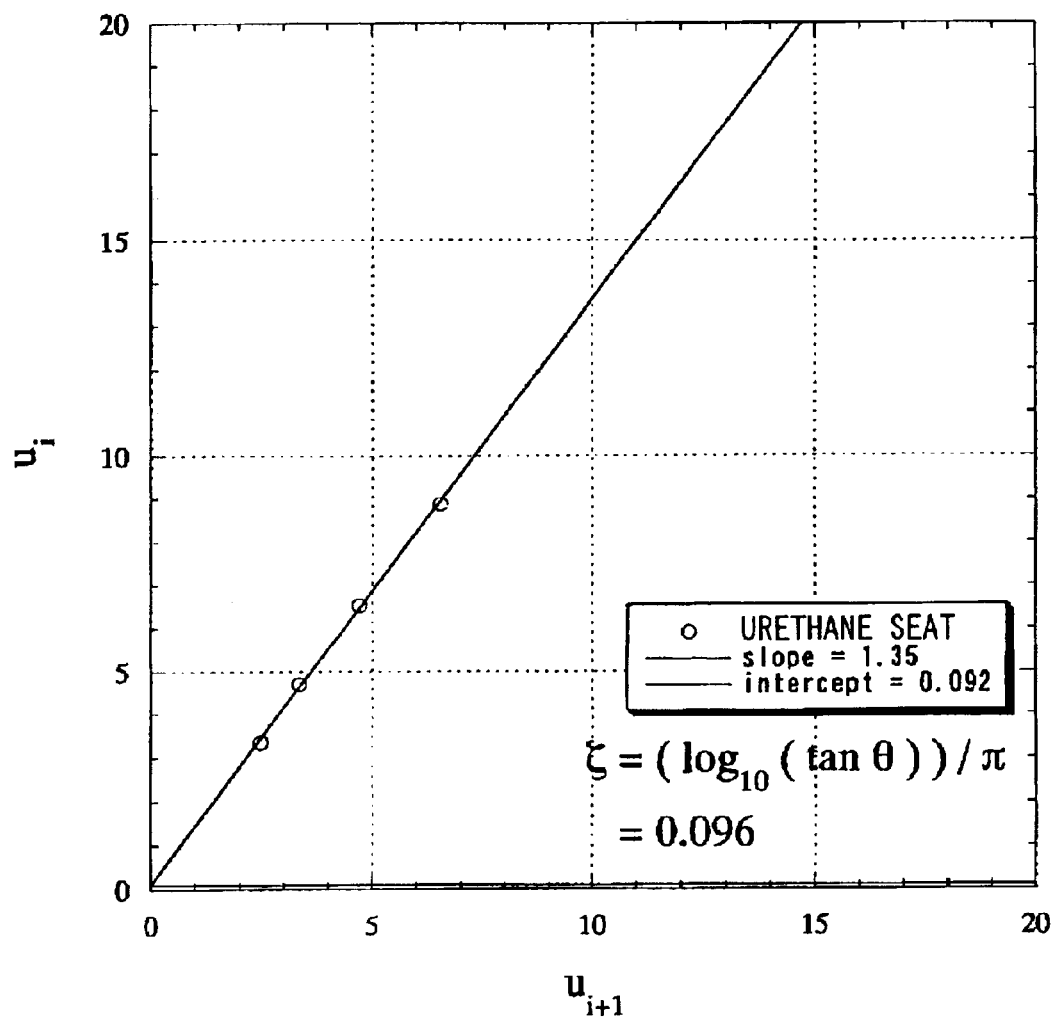
FIG. 22 is a view showing a damping ratio in Comparison Example 2.

A weight of 20 kg having a diameter of 26 cm, and a thickness of 6.6 cm is dropped from the position contacting with each surface of the seat cushion portions in Example 1, Comparison Example 1 and Comparison Example 2 described above, and their damping ratios are measured. Respective damped wave forms are shown in FIG. 17 to FIG. 19, and respective damping ratios are shown in FIG. 20 to FIG. 22. Incidentally, the damping peaks (Calculated Point) shown by a black dot in the free vibration damping curves of respective damped wave forms are plotted in FIG. 20 to FIG. 22.

In the case of Comparison Example 1, as clear from FIG. 18 and FIG. 21, each calculation point was plotted substantially linearly, and the damping ratio was 0.104. In the case of Comparison Example 2, as clear from FIG. 19 and FIG. 22, each calculation point was plotted substantially linearly, and the damping ratio was 0.096.

On the other hand, in the case of Example 1 adopting the seat structure of the present invention, as clear from FIG. 20, comparing with hollow points plotted along a straight line of damping ratio 0.04, there exist the calculated points shown by a black dot far way off the straight line of the damping ratio 0.04. And these black dots are positioned on a separated substantially straight line. Accordingly, in the case in Example 1, it is understood that a damping characteristic of damping ratio 0.6 obtained by connecting these black dots is existing. In other words, it shows that the damping characteristics of the seat cushioning member 14 provided with a camber shape in Example 1 are different according to various conditions of inputted vibration in the range in damping ratio from 0.04 to 0.6 which is damping ratio of less than 1. When compared with a damped wave form in FIG. 17, it becomes clear that it has a structure in which, for an input of a large excitation force which is a large amplitude vibration or a high frequency vibration having large acceleration with the same amplitude, the strain energy of the tension structure of the elastic member becomes large to lower the tension and to generate a high damping ratio by shifting in the back-and-forth direction of the top 11a of the bulging portion 11 forming a camber shape so that a large damping characteristic can be functioned, and for an input of a small excitation force which is a small amplitude vibration or a small frequency vibration having small acceleration with the same amplitude, the damping ratio is suppressed to be small by the tension of the tension structure and phase difference to the input vibration is followed by the spring characteristics of the seat cushioning member 14 so that the vibration can be relieved.

On the contrary, in the case in Comparison Example 1 and in Comparison Example 2, since the damping ratio is constant as described above, it becomes clear that the performance of the seat structure of the present invention adopted in Example 1 is high in the point of dispersion efficiency of the force accompanied by the excitation force as an input.

TEST EXAMPLE 3

The vibration transmission characteristics are measured for Example 1, Comparison Example 1 and Comparison Example 2 described above. The test is carried out in such that a weight of 20 kg in weight, 26 cm in diameter and 6.6 cm in thickness is first put on each seat cushioning member while adjusting nearly the center of the weight to the portion corresponding to the tuber of ischium when a person is seated. Then, a platform of a vibrator is disposed under the seat cushion portion and the vibration transmission ratio (G/G) for frequency is measured. The result is shown in FIG. 23.

As clear from the figure, in the seat structure of the present invention in Example 1, when the vibration transmission ratio (G/G) is compared with Comparison Example 2, it is found that the vibration transmission ratio in almost all frequency area from a low frequency to a high frequency is low. When it is compared with Comparison Example 1, the vibration transmission ratio (G/G) in a low frequency area equal to or smaller than 6 Hz is found to be largely reduced. In particular, the resonance peak is remarkably low in Example 1 compared with Comparison Example 1 and Comparison Example 2. In addition, when a person having a weight of 64 kg is considered to take a seat, 5 Hz in FIG. 23 corresponds to 3 Hz, and 10 Hz corresponds to 6 Hz. Therefore, it is found that swinging of 2 Hz or less and 5 Hz which swings a skeletal structure of a human body itself which affects the ride comfort of the car becomes difficult to be transmitted.

The vibration transmission ratio (G/G) for a Japanese man (JM) of 64 kg in weight in a state of seating on the seat cushion each having the seat structure in Example 1, Comparison Example 1 and Comparison Example 2 is measured in the same manner as described above. The result is shown in FIG. 24.

As clear from the result, the vibration transmission ratio (G/G) in Example 1 is largely improved compared with that in Comparison Example 2, and even when compared with that in Comparison Example 1, it is found that the resonance peak is largely reduced. Further, from these results, correlation between the result in FIG. 23 and the result in FIG. 24 is recognized.

(Second Embodiment)

Figure 25A:
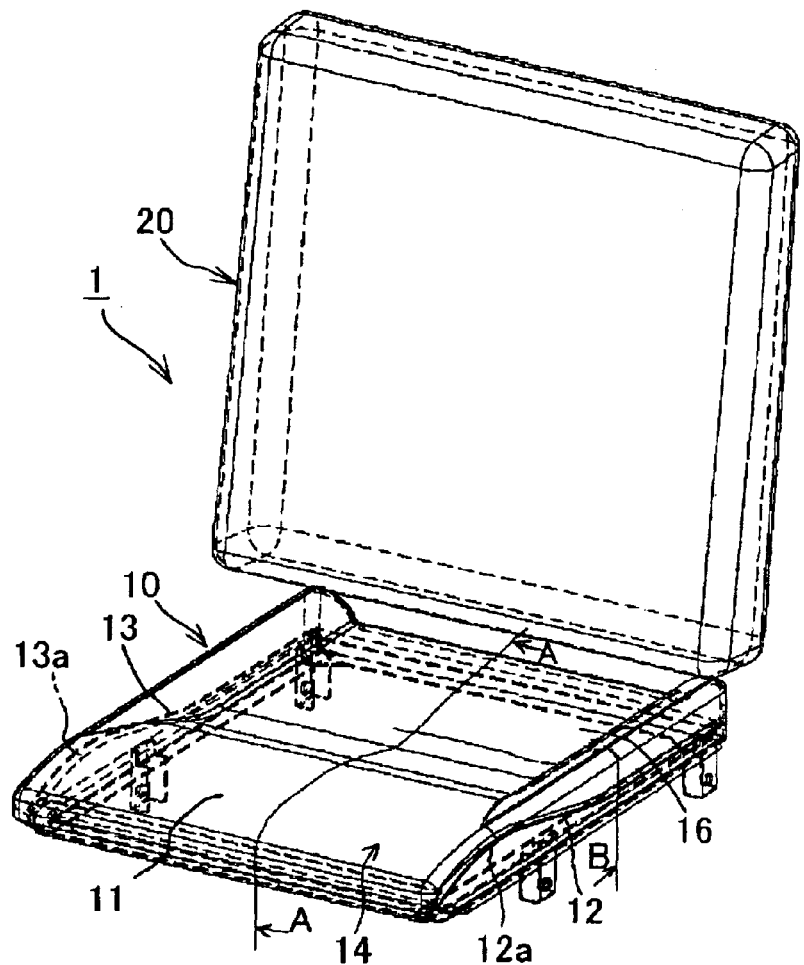
FIG. 25A is a perspective view showing a seat structure relating to a state of a second embodiment of the present invention.
Figure 25B:
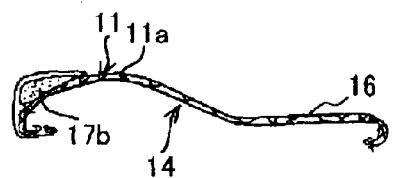
FIG. 25B is a cross sectional view taken along the A—A line in FIG. 25A.
Figure 25C:
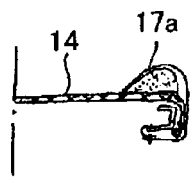
FIG. 25C is a B arrow diagram in FIG. 25A.

FIG. 25 is a perspective view showing the second embodiment of the present embodiment. In the present embodiment, as the side frames 12 and 13 of the seat cushion portion 10, a shape having arch portions 12a and 13a near on the front edge is adopted, and a three-dimensional net member which is the seat cushioning member 14 is put up between the side frames 12 and 13. Then, the seat cushioning member 14 is formed in a camber shape having a bulging portion 11 near on the front edge, and becomes a shape which is provided with a flat portion 16 put up substantially in a flat state from nearly middle portion in the back-and-forth direction to the rear portion. Further, in the vicinity of the side frames 12 and 13, a polyurethane foam 17a is disposed to reduce a feeling of something foreign, and a polyurethane foam 17b for supporting is disposed on the top surface of the seat cushioning member 14 in the vicinity of the front edge. Incidentally, as a measure for reducing a feeling of something foreign, it is possible to achieve the object by modifying the frame shape or by adopting a means for imitating three-dimensionally the three-dimensional net member.

In the present embodiment, the haunches take place on the flat portion 16, and large damping characteristics do not function to a vibration input of an ordinary small excitation force, and the vibration is relieved by the spring property of the flat portion. Further, since the bulging portion 11 is positioned under the femoral region, slipping out of position of the haunches forward when a person is seated can be suppressed. On the other hand, when vibration having a large excitation force is inputted, the top 11a of the bulging portion 11 deforms so as to shift itself forward. And by the strain energy of the tension structure, large damping characteristics function so that rebound of the human body from the seat can be made small.

Figure 26A:
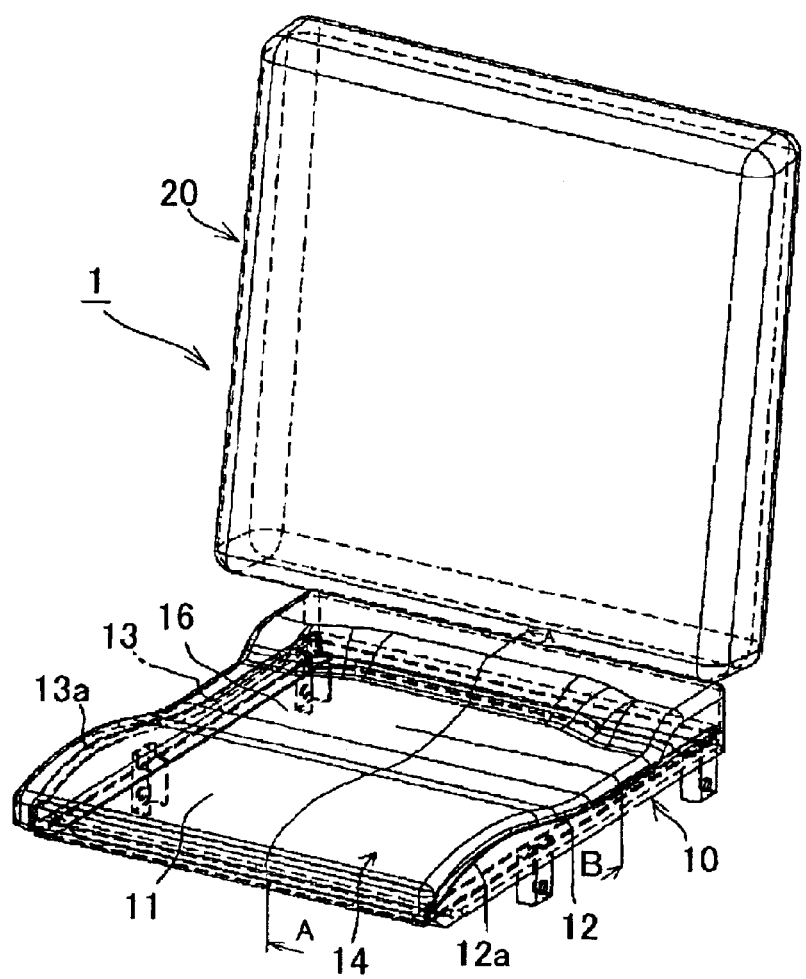
FIG. 26A is a perspective view showing a seat structure relating to another state of the second embodiment of the present invention.
Figure 26B:
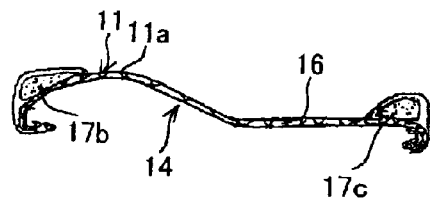
FIG. 26B is a cross sectional view taken along the A—A line in FIG. 26A.
Figure 26C:
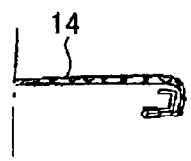
FIG. 26C is a B arrow diagram in FIG. 26A.

It should be noted that though a polyurethane foam is disposed on the front edge portion of the seat cushioning member 14 and in the vicinity of the side frames 12 and 13 in a state shown in FIG. 25, as shown in FIG. 26, it is possible to make a shape in which the polyurethane foams 17b and 17c are disposed in the vicinity of the front edge portion and rear edge portion so as to make the slipping out of position of the haunches in the back-and-forth direction smaller. Further, in the present embodiment, the bulging portion is formed on the seat cushion portion. However, the bulging portion can be formed on the seat back portion, and further, the bulging portion can be formed on each of the seat cushion portion and the seat back portion.

(Third Embodiment)

FIG. 27 is a perspective view of an outside appearance showing the seat structure 1 relating to the third embodiment of the present invention. As shown in this figure, in the present embodiment, the side frames 12 and 13 having no bulging portion in a midway are used for the seat cushion portion 10, while the ones having a shape with a bulging portion in which the midway thereof is pushed out forward are used for the side frames 22 and 23 to form the seat back portion 20 are adopted, and the seat back portion 20 is formed to a camber shape providing the bulging portion 21. In other words, a three-dimensional net member is used for the back cushioning member 24, and the bulging portion 21 is formed by putting up this member between the above-described side frames 22 and 23 of the shape in which the midway thereof is pushed out forward.

According to the present embodiment, when the weight of a seated person is exerted on the seat back portion 20, the seat back portion deforms in such that the position of the top 21a of the bulging portion 21 goes away upward or downward. As a result, in particular, when a large load is applied in the back-and-forth direction, the large load is absorbed not only by the displacement in the back-and-forth direction of the bulging portion 21 but also by the deformation in vertical direction accompanied by the movement of the top portion 21a of the bulging portion 21. On the other hand, an input of a small excitation force in an ordinary seated state can be relieved by its spring property. These points are seen in the same manner as in the seat cushioning member 14 of the seat structure 1 relating to the first embodiment, and in the back cushioning member 24 relating to the third embodiment also acting in accordance with the magnitude of an excitation force to be an input, a large damping characteristic having a high damping ratio acts to a vibration having a large excitation force, and a small damping characteristic having a low damping ratio acts to a vibration having a small excitation force.

It should be noted that since front portions of the side frames 12 and 13 are curved downward in the vicinity of the front edge portion 10a of the seat cushion portion 10, the seat cushioning member 14 is curved downward and is put. Therefore, in the vicinity of the front edge portion 10a, the front edge portion 10a is strained forward and bulges out in accordance with the magnitude of the vibration inputted on the portion corresponding to the tuber of ischium of the seat cushioning member 14. Accordingly, a camber shape is practically formed also in this portion in the present embodiment, a high damping ratio can be acted to an input of a large excitation force.

Here, a frame composing the seat back portion 20 of the seat structure 1 in the third embodiment described above, in more detail, as shown in FIG. 28, comprises outer frame 27 including the side frames 22 and 23, frames 22a and 23a for forming the bulging portion, which are attached to the side frames 22 and 23, an upper frame 25, and a connection rod 19 which is disposed between the lower portions of the side frames 22 and 23, and no other reinforcement frame put up between the side frames 22 and 23 exists between the upper frame 25 and the connection rod 19. Therefore, when a larger impact than predetermined (impact vibration and impact force) is applied in the back-and-forth direction, the outer frame 27 has a deformable structure which is pulled by the three-dimensional net member forming a tension structure. Incidentally, it is needless to say that such an structure is adoptable in the above-described first and second embodiments.

Accordingly, when the back of a seated person is relatively shifted backward by a large impact being applied in the back-and-forth direction, a substantially center portion of the back cushioning member 24 consisting of a three-dimensional net member slides on the connection rod 19 and is pushed toward the rear of the seat back portion, and accompanied by this, the outer frame 27 dispersedly receives the load inputted into the back cushioning member 24, it falls inside and deforms from the state shown by the broken line to the state shown by the solid line in the drawing in the direction shown by the arrow so that the impact is damped. As a result, since a gap between the side frames 22 and 23 disposed facing to each other becomes narrow, the three-dimensional net member (the back cushioning member 24) put up at a predetermined tension between the side frames 22 and 23 comes loose at once. When the tension of the three-dimensional net member (the back cushioning member 24) once loosens, it is no longer a tension structure. At this time, a high damping characteristic possessed by the three-dimensional net member itself also functions. The damping ratio acting at this large deformation time like this, is preferably arranged to have a difference of 0.2 or more compared with that at a small deformation time (at the time when an excitation force to be an input is small). Furthermore, it is more preferable to arrange to be a critical damping system or an over damping system having a damping ratio of 1 or more. Through this formation, rebound of a human body by a reaction force is suppressed. In addition, by continuing to receive the impact force, a new tension field is created in the three-dimensional net member and the force thereof is converted to strain energy so that the working time of the impact force is lengthened.

Figure 29:
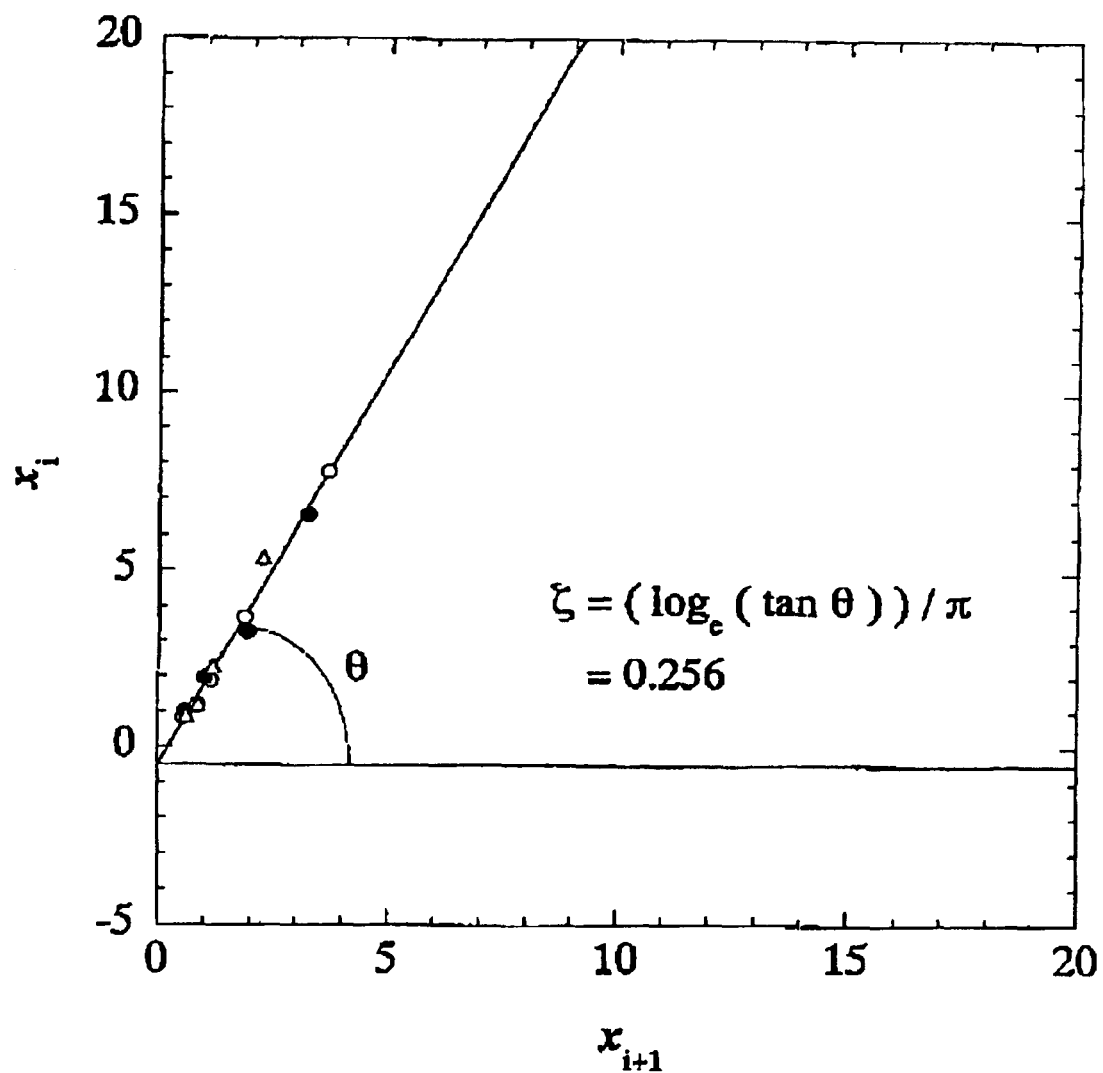
FIG. 29 is a chart showing damping characteristics measured at the weight of 5 kg for a seat cushion portion of the seat structure using a conventional three-dimensional net member.
Figure 30:
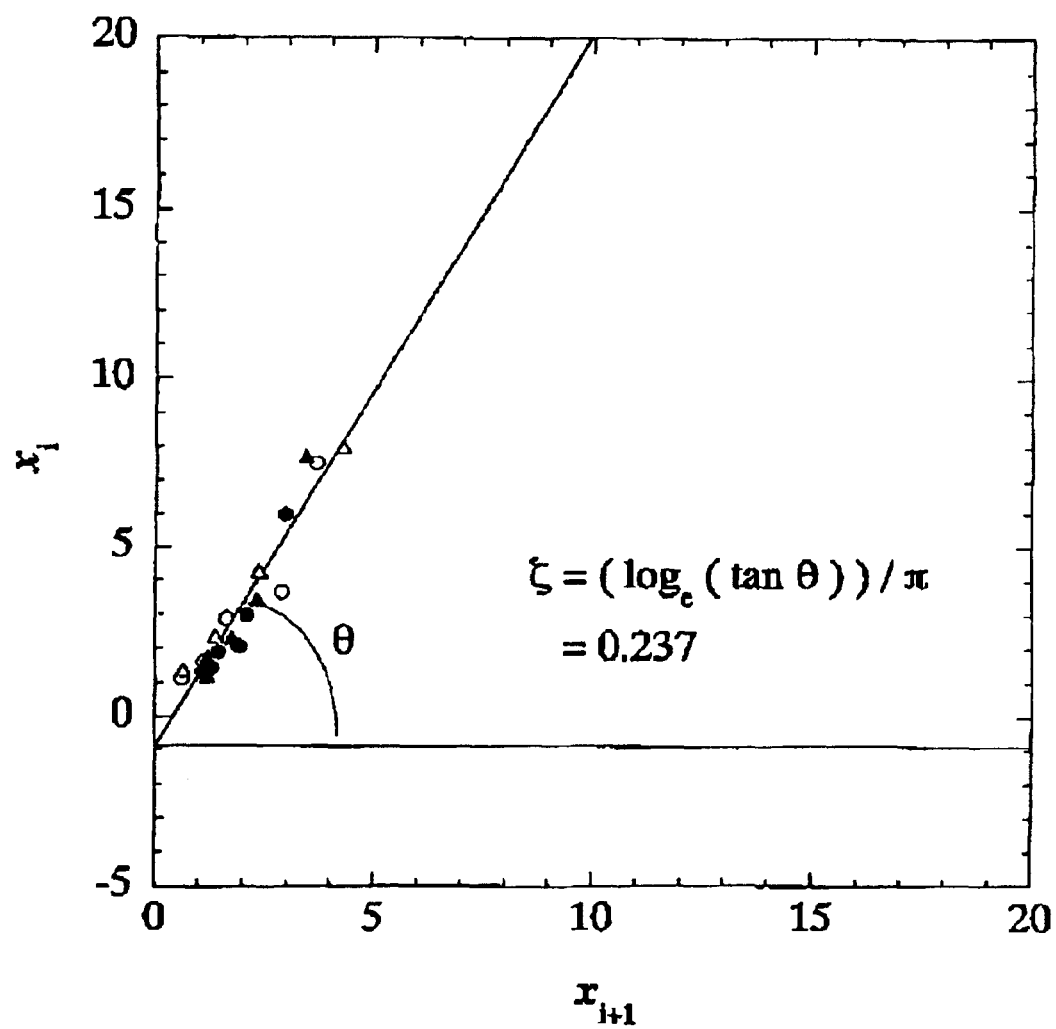
FIG. 30 is a chart showing damping characteristics measured at the weight of 10 kg for a seat cushion portion of the seat structure using the conventional three-dimensional net member.
Figure 31:
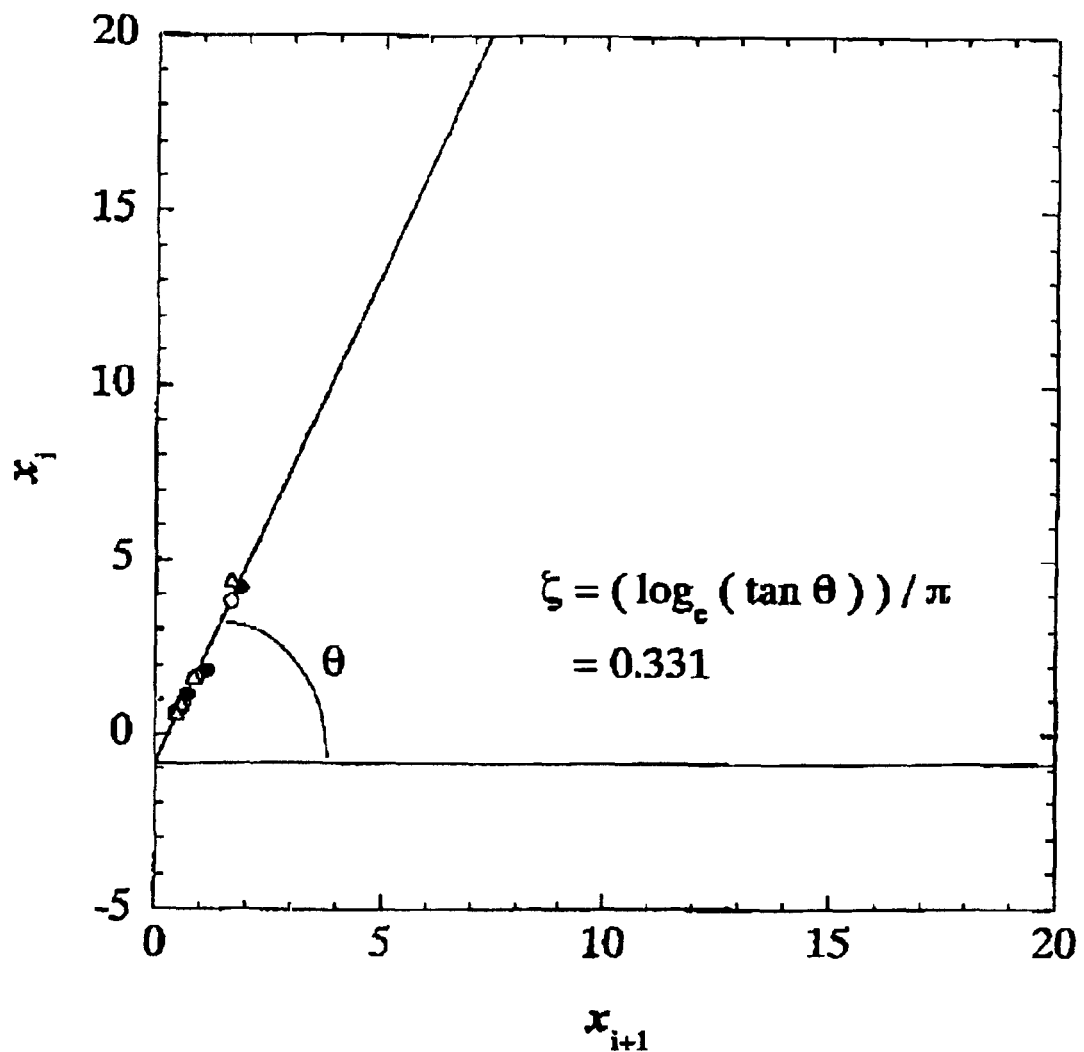
FIG. 31 is a chart showing damping characteristics measured at the weight of 5 kg for a seat back portion of the seat structure using a conventional three-dimensional net member.
Figure 32:
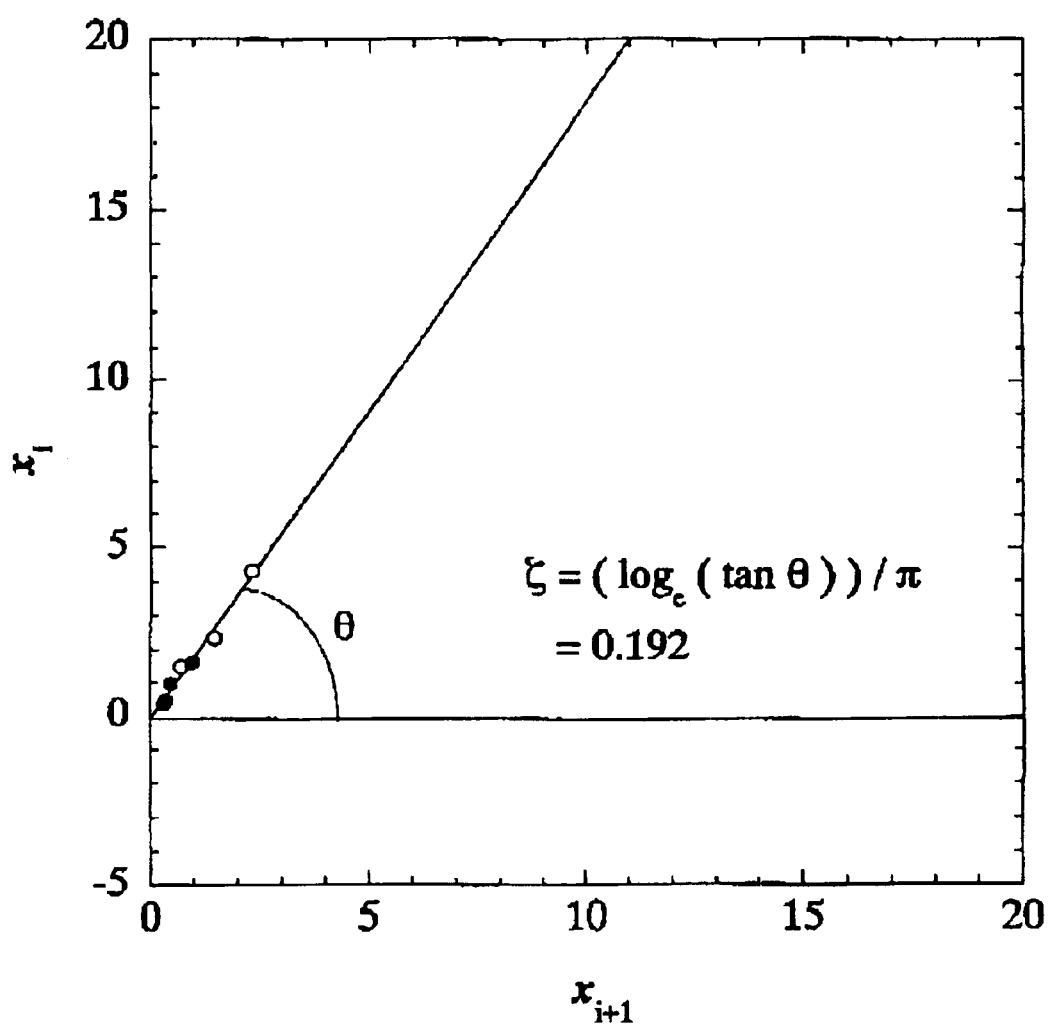
FIG. 32 is a chart showing damping characteristics measured at the weight of 10 kg for the seat back portion of the seat structure using the conventional three-dimensional net member.

Here, FIG. 29 to FIG. 32 are charts showing the damping characteristics of a conventional seat structure which is not provided with the bulging portion like that of the present invention on either seat cushion portion or seat back portion, and does not include a camber shape. More in detail, it is structured in a manner that in this seat structure, a flat spring member is supported between side frames for a seat cushion portion through coil springs, and a three-dimensional net member as a seat cushioning member is put up thereon, and between side frames for the seat back portion, a three-dimensional net member as a back cushioning member is put up at rate of elongation of less than 5% at no load. Incidentally, FIG. 29 and FIG. 30 show the damping characteristics for a seat cushion portion, FIG. 31 and FIG. 32 show the damping characteristics for a seat back portion, and a weight of 5 kg is used to measure the damping characteristics in FIG. 29 and FIG. 31, and a weight of 10 kg is used in FIG. 30 and FIG. 32.

As clear from FIG. 29 and FIG. 30, when the weight is changed in weight, the damping ratios are nearly the same as 0.256 at the weight of 5 kg and 0.237 at the weight of 10 kg in the case of the seat cushion portion. On the other hand, in the case of the seat back portion, the damping ratio for the weight of 5 kg is 0.331 while the damping ratio for the weight of 10 kg is 0.192.

Here, damping ratio is expressed by the equation $$\zeta = \frac{c}{2\sqrt{mk}} \qquad \text{(equation 1)}$$

Therefore, in the seat back portion, since no coil spring is disposed and only the three-dimensional net member is put up, the damping ratio largely depends on the load mass m in the above equation, the larger the load mass the smaller the damping ratio becomes. On the other hand, when the coil springs are provided in the case of the seat cushion portion, since function of the spring constant k becomes large, the input dependency becomes small. The charts shown in FIG. 29 to FIG. 32 show such the phenomenon.

Figure 28:
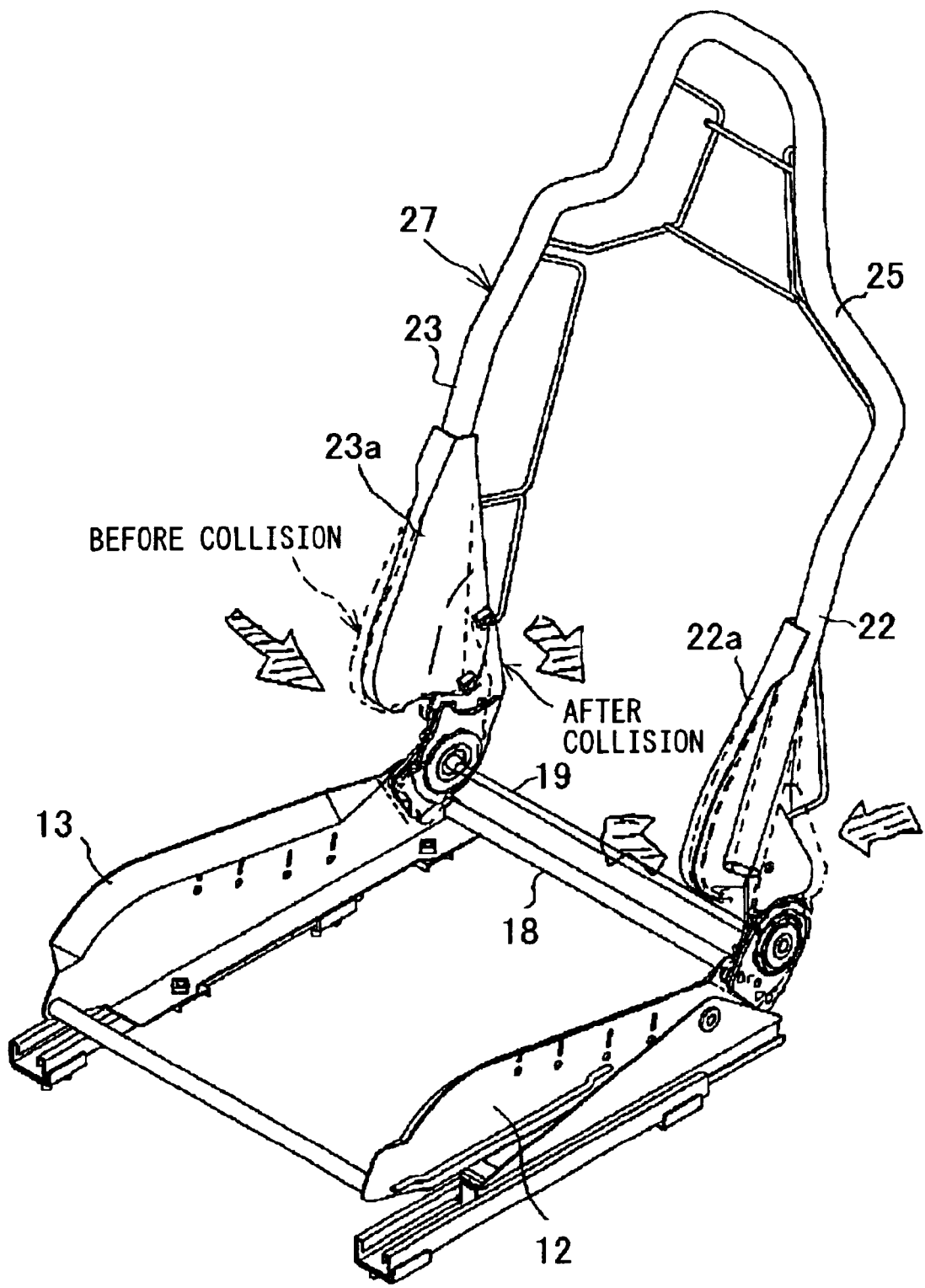
FIG. 28 is a perspective view showing a detailed structure of frames composing a seat back portion of the seat structure relating to the third embodiment of the present invention.

When a system provided with a predetermined damping ratio of less than 1 is a critical damping system or an over damping system at the time of adding a large impact, it is difficult to arrange so even by adjusting the spring constant k and the load mass m. Accordingly, by forming a camber shape provided with a bulging portion like in the present invention, and at the same time, as shown in FIG. 28, by making a structure in the manner that when a large impact load is applied on the three-dimensional net member which is put up as shown in FIG. 28, the outer frame is deformed in accordance with the three-dimensional net member, the tension of the three-dimensional net member is loosened and, as a result, high damping characteristics which the three-dimensional net member itself possesses can be functioned. Therefore, by making such a structure, a critical damping system or an over damping system can be formed.

For the seat structure of the present embodiment in which the three-dimensional net member is put up to the frame member shown in FIG. 28, a dummy doll of 100 kg in weight is mounted and fixed on the seat with a seat belt, and a rear-end collision test is carried out. Incidentally, the test is carried out in such that a flat car is collided at the maximum acceleration of 171.1 m/s2, last speed of 7.1 m/s with a car frame loaded with each seat structure from behind, and each acceleration of the breast portion and the waist portion is measured.

Figure 33A:
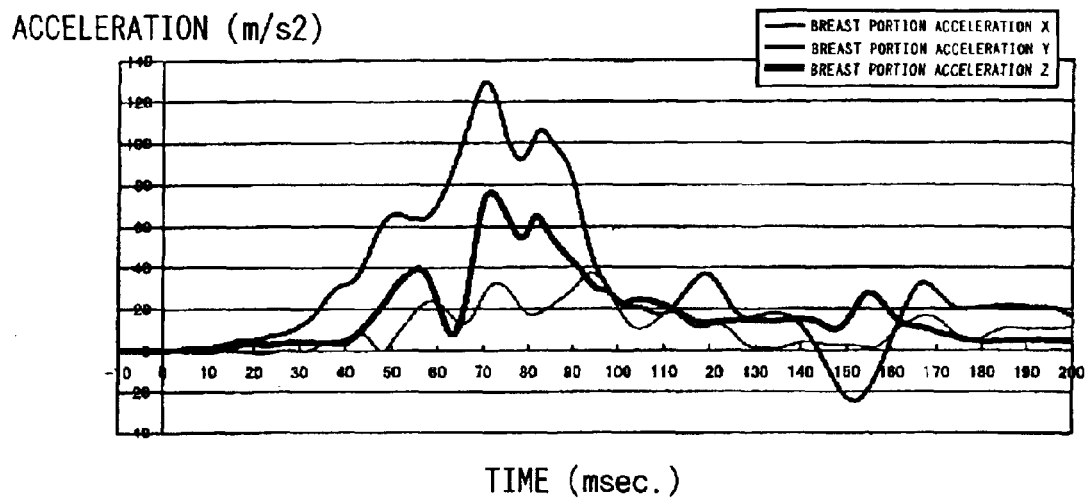
FIG. 33A and FIG. 33B are views showing a rear-end collision test result for the seat structure (net seat) of the third embodiment in which the three-dimensional net member is put up on the frame members shown in FIG. 28, wherein FIG. 33A designates a breast portion acceleration and FIG. 33B designates a waist portion acceleration.
Figure 33B:
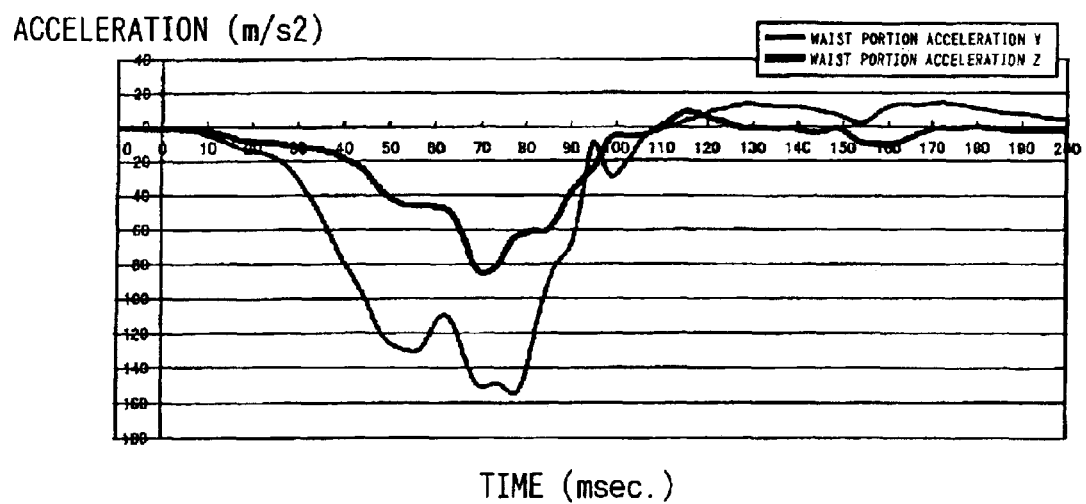

The result is shown in FIG. 33A and FIG. 33B. In the drawings, FIG. 33A designates a breast portion acceleration and FIG. 33B designates a waist portion acceleration. Incidentally, in the drawings, X designates acceleration in the right-and-left direction (BL direction), Y designates acceleration in the back-and-forth direction (TL direction), and Z designates acceleration in the vertical direction (WL direction).

First, as clear from FIG. 33A, after the breast portion is pushed backward till the point in time of about 50 msec after the collision, it is pushed backward by deformation of the frames, shows the maximum acceleration in the vicinity at about 70 msec to 80 msec and the acceleration is settled until about 110 msec. These phenomena occur when deformation is created on the frames by pulling the three-dimensional net member which is a tension structure toward a central portion and lowering the tension of the three-dimensional net member at once. Actually, the head portion of the dummy doll shows no large rebound in the back-and-forth direction during this period. Next, after a small rise of the acceleration due to deformation of the frames at about 110 msec, the deformation of the frames is continued till about 150 msec, and it shows a behavior of a small rise of the acceleration again thereafter.

Though increase of the acceleration is created in the vicinity at about 150 msec, since a moment generated in the rotational direction due to shifting of the trunk cancels a force of the head portion to shift forward created by the reaction force of the back cushioning member, and the increase of the acceleration occurs in a state of fixing the head portion with a sheet, an amount of shifting of the head portion in the back-and-forth direction is small. Therefore, this increase of acceleration is considered to be an increase of the acceleration due to restoring force of the frames.

Further, as clear from FIG. 33A, at 50 to 60 msec when the waist portion is pushed to the back cushioning member at first, acceleration in the vertical direction never exceeds the value of the acceleration in the horizontal direction, which shows that rebound of the dummy doll is not many.

In acceleration of the waist portion in the vertical direction shown in FIG. 33B, it settles quickly after increase of the acceleration, which shows there is little change in acceleration and rebound of the waist portion is a little.

As clear from the result described above, according to the present embodiment, since the tension looses when the three-dimensional net member which is a tension structure receives a large impact vibration, it is understood that it shows high damping characteristics. In other words, as evaluation of an impact absorption characteristic, it is desirable that relative displacement between the head portion and waist portion in the back-and-forth direction is small, and acceleration in the vertical direction is small. The present embodiment has a structure to exhibit very close characteristics to such a desirable characteristic.

(Fourth Embodiment)

In the first to third embodiments, a three-dimensional net member which forms a camber shape on the seat cushion portion or on the seat back portion as a cushioning member is used in all cases. However, it is enough for the seat structure of the present invention to have a structure that at the position of equilibrium point when taking seat, for an input with a small excitation force, the damping characteristic is small by the tension of the tension structure so that it can relieve the vibration with its phase difference due to the function of the spring characteristics, and for an input with a large excitation force, large damping characteristics function due to the strain energy of the tension structure, in other words, it is enough to have a structure that damping characteristics with different damping ratios function in a region with a damping ratio of less than 1 according to the magnitude of the excitation force.

Accordingly, it is possible to achieve a structure having such characteristics by using urethane materials such as polyurethane foam, viscoelastic urethane and so on. In order to form a structure provided with such characteristics using a urethane material, it is necessary to form a cushioning member of a three-layer structure made of urethane materials having different characteristics as follows. Furthermore, in order to form a tension structure, it is necessary to layer a fabric material which can generate tension in the tangential direction on either of these cushioning members, tension imparting members such as a two-dimensional fabric and a two-dimensional knitting.

In other words, for a first urethane layer disposed as an upper layer, the one provided with a soft characteristic in spring constant close to the spring constant of a muscle of a human body is used. For instance, viscoelastic urethane and the like are used. For a second urethane layer disposed as a middle layer, a urethane foam which is high in restoring force of linearity of 0.2 or more and hysteresis loss of 30% or less and so on are used. Furthermore, for a third urethane layer disposed as an under layer, a polyurethane foam and the like which have large damping characteristics in damping ratio of 0.1 or more are used.

As the first urethane layer, by adopting the cushioning member close to a spring constant of a muscle of a human body, that is, by adopting the cushioning member in the range of 4N/mm to 0.5N/mm in load characteristic at the time of applying pressure with a compressed board of 98 mm in diameter, it is found that the muscle does not deform so much and the first urethane layer easily deforms and bends when contacting with the first urethane layer at the time of seating. Then, feeling of fitting to a human body is enhanced.

On the other hand, when vibration with a small excitation force is inputted, it is relieved by a restoring force of a second urethane layer which is high in restoring force. At this time, a third urethane layer which has a high damping characteristic does not function so much. Therefore, only a small damping characteristic functions as a whole cushioning member having a layered structure relating to the fourth embodiment. Incidentally, "linearity" is a ratio of a deflection amount at the time of 45 kgf load to a deflection amount of 45 kgf to 100 kgf and the reason of setting the linearity in the second urethane layer to be 0.2 or more is to ensure a feeling of stroke at the time of seating. In addition, the reason of setting the hysteresis loss to be 30% or less is because when the hysteresis loss exceeds 30%, the damping force becomes large so that the restoring property becomes small and a feeling of spring action becomes poor.

Further, when vibration of a large excitation force is inputted, the large damping characteristic of the third urethane layer made of a urethane material having a damping ratio of 0.2 or more functions. Due to this function, an input of a large excitation force can be damped so that rebound of a seated person can be prevented. In such a case, owing to the function of the tension imparting member imparted on any of the above-described first to third urethane layers, the strain energy in the tangential direction of such a urethane layer becomes large to lower the tension in the tangential direction as in the case of the above-described each embodiment so that a large damping characteristic can be functioned.

Besides, instead of the three-dimensional net member used in each of the above-described embodiments, a two-dimensional tension structure with urethane which is provided with a two-dimensional tension structure such as a two-dimensional fabric or a two-dimensional knitting and so on, and an urethane layer having a surface layer layered on the two-dimensional tension structure may be used. And as an urethane layer, a thin urethane foam of about 2 to 30 mm may be used.

When the present invention is structured with such a two-dimensional tension structure with urethane, though the durability is a little poor, and the spring property is somewhat high, almost the same function and effect as in the case of using the above-described three-dimensional net member can be obtained. Therefore such a two-dimensional tension structure with urethane is useful for various seat structures similar to a three-dimensional net member. Needless to say, since the two-dimensional tension structure with urethane is a tension structure-put up to each frame member at a rate of elongation of 30% or less similar to the three-dimensional net member, when a large impact is inputted at the time of collision and the like, a high damping characteristic having a difference in damping ratio of 0.2 or more can be exhibited due to deformation of the frame member, preferably, a critical damping system or a over damping system can be created.

The seat structure of the present invention has a structure of changing the damping characteristics functioned by the strain energy and change in tension by deformation created by a plane wave of the tension structure in response to the magnitude of the excitation force to be an input in the cushioning member to be a tension structure. Since the damping characteristics function with a small damping ratio to an input of a small excitation force, it can be relieved a vibration with a phase difference due to the spring property of the cushioning member, and to an input of a large excitation force, by increase of the strain energy and decrease of the tension, the damping characteristics function with a large damping ratio and a long working time so that rebound of a human body upward can be suppressed. Further, when a three dimensional net member or a tension structure with urethane is used as a cushioning member in the seat back portion, and at the same time when equal to or more than a predetermined load is applied due to impact, high damping characteristics can be exhibited by making a structure deform the frames which constitute the seat back portion, and preferably a critical damping system or an over damping system can be formed and it is effective to suppress the rebound of a human body when a large impact is received.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A seat structure comprising
a cushioning structure having a seat cushioning member for a seat cushion and a back cushioning member for a seat back,
wherein said seat cushioning member and said back cushioning member are provided as a tension structure having a tension field formed from an elastic member, and
at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;
wherein said cushioning structure forms a vibration system in which an arbitrary portion of the seat cushioning member positioned more front than the vicinity of the boundary of the seat cushion portion and the seat back portion and/or an arbitrary of the back cushioning member positioned upper than the vicinity of said boundary portion portion serves as an free end by putting an extendable direction on the plane surface of the cushioning structure along the back-and-forth direction of the seat cushion portion and along the vertical direction of the seat back portion respectively, and by holding the vicinity of the boundary portion of the seat cushion portion and the seat back portion; and
wherein in at least one of said seat cushioning member and back cushioning member in which said vibration system is formed, tension in the tangential direction is varied by changing the strain energy of the tension structure formed from an elastic member in accordance with the excitation force to be an input, and at least the other of said seat cushioning member and back cushioning member includes a portion exhibiting relatively high spring characteristics in the normal line direction of the tension structure, and has a structure in which an excitation force inputted from the normal line direction to said cushioning member is scatterable into an excitation force in the tangential direction by a combined function of these different characteristics.

2. A seat structure comprising
a cushioning structure having a seat cushioning member for a seat cushion and a back cushioning member for a seat back,
wherein said seat cushioning member and said back cushioning member are provided as a tension structure having a tension field formed from an elastic member, and
at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;
wherein any of the seat cushioning member and the back cushioning member which can exhibit damping characteristics different in damping ratio according to the magnitude of said excitation force to be an input is formed of a three-dimensional net member made by connecting a pair of ground knitted fabrics disposed apart from each other with a connecting fiber; and
wherein said cushioning member is put up at a rate of elongation of 30% or less between side frames provided in the seat cushion portion or in the seat back portion at the time of no load, and is arranged to be in a camber shape provided with a top portion bulging upward in the case of the seat cushion portion and forward in the case of the seat back portion within an area of contact with a human body.

3. The seat structure according to claim 2, wherein the top of the bulging portion of said seat cushioning member or back cushioning member having a camber shape is arranged to be deformable to shift each of the positions thereof forward for the seat cushion portion and upward for the seat back portion in a equilibrium state within an area of contact with a human body.

4. The seat structure according to claim 2, wherein the seat cushioning member or the back cushioning member having said camber shape is put up between the side frames having an arch shape in the width direction.

5. The seat structure according to claim 2, wherein the seat cushioning member or the back cushioning member having said camber shape is put up between the side frames having an arch shape in the width direction.

6. The seat structure according to claim 2, wherein said seat cushioning member is formed to be a camber shape, and the top thereof is in front 100 mm or more from the boundary of the seat cushion portion and the seat back portion seen from the side, and in front of the portion under the tuber of ischium.

7. The seat structure according to claim 3, wherein a rate of elongation of said seat cushioning member or back cushioning member is set to be partially different depending on the position in the range of said rate of elongation of 30% or less.

8. The seat structure according to claim 7,
wherein the cushioning members are put up at a relatively high rate of elongation compared with other portions in the vicinity of the tuber of ischium and in the vicinity of the lumber vertebra.

9. A seat structure comprising
a cushioning structure having a seat cushioning member for a seat cushion and a back cushioning member for a seat back,
wherein said seat cushioning member and said back cushioning member are provided as a tension structure having a tension field formed from an elastic member, and
at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;
wherein both of said seat cushioning member and back cushioning member are formed of a three-dimensional net member which is formed of a pair of ground knitted fabrics disposed apart from each other connected with a connecting fiber; and
wherein any of said cushioning members which can exhibit damping characteristics different in damping ratio according to the magnitude of said excitation force to be an input is put up at a rate of elongation of 30% or less between side frames provided in the seat cushion portion or in the seat back portion at the time of no load, and is arranged to be in a camber shape provided with a top portion bulging upward in the case of the seat cushion portion and forward in the case of the seat back portion within an area of contact with a human body.

10. A seat structure comprising
a cushioning structure having a seat cushioning member for a seat cushion and a back cushioning member for a seat back,
wherein said seat cushioning member and said back cushioning member are provided as a tension structure having a tension field formed from an elastic member, and
at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;
wherein any of the seat cushioning member and the back cushioning member which can exhibit damping characteristics different in damping ratio according to the magnitude of said excitation force to be an input is formed of a tension structure with urethane provided with a two-dimensional tension structure and an urethane layer to be layered in said two-dimensional tension structure; and
wherein said cushioning member is put up at a rate of elongation of 30% or less between side frames provided in the seat cushion portion or in the seat back portion at the time of no load, and is arranged to be in a camber shape provided with a top portion bulging upward in the case of the seat cushion portion and forward in the case of the seat back portion within an area of contact with a human body.

11. A seat structure comprising a cushioning structure having a seat cushioning member for a seat cushion and a back cushioning member for a seat back.

wherein said seat cushioning member and said back cushioning member are provided as a tension structure having a tension field formed from an elastic member, and at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;

wherein both of said seat cushioning member and said back cushioning member are formed of a tension structure with urethane provided with a two-dimensional tension structure and an urethane layer to be layered in said two-dimensional tension structure; and wherein any of said cushioning members which can exhibit damping characteristics different in damping ratio according to the magnitude of said excitation force to be an input is put up at a rate of elongation of 30% or less between side frames provided in the seat cushion portion or in the seat back portion at the time of no load, and is arranged to be in a camber shape provided with a top portion bulging toward in the case of the seat cushion portion and forward in the case of the seat back portion within an area of contact with a human body.

12. A seat structure comprising a cushioning structure having a seat cushioning member for a seat cushion and a back cushioning member for a seat back, wherein said seat cushioning member and said back cushioning member are provided as a tension structure having a tension field formed from an elastic member, and at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;

wherein any of the seat cushioning member and the back cushioning member which can exhibit damping characteristics different in damping ratio according to the magnitude of said damping force to be an input is made of a layered structure, said layers comprising:

a first soft urethane layer disposed as an upper layer and having an spring constant close to the spring constant of the muscle of a human body;

a second urethane layer disposed as a middle layer and having a high restoring property of 0.1 or more in linearity and 30% or less in hysteresis loss factor;

a third urethane layer disposed as a lower layer and exhibiting the damping characteristics of 0.2 or more in a damping ratio; and a tension-imparting member layered on any of the above-described layers and tension in the tangential direction.

13. A seat structure comprising a cushioning structure having a seat cushioning member for a seat cushion and a back cushioning member for a seat back, wherein said seat cushioning member and said back cushioning member are provided as a tension structure having a tension field formed from an elastic member, and at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;

wherein said back cushioning member is designed to have a large deflection amount at the portion corresponding to the position in the vicinity of the scapula, and a small deflection amount at the position corresponding to the position in the vicinity of the acromion and/or the lumber vertebra.

14. The seat structure according to claim 13, wherein the deflection amount of the portion corresponding to the position in the vicinity of said scapula is in the range of 50 to 150 mm.

15. The seat structure according to claim 13, wherein the spring constant in the vicinity of the equilibrium point of the portion corresponding to the position in the vicinity of said scapula is 15 N/mm or less n load characteristic with a compression board of 20 mm in diameter, the spring constant in the vicinity of the equilibrium point of the portion corresponding to the position in the vicinity of the acromion is in the range of 0.2 to 2.0 N/mm in load characteristic with a compression board of 50 mm in diameter, and the spring constant in the vicinity of the equilibrium point of the portion corresponding to the position in the vicinity of the lumber vertebra is in the range of 5 N/mm or more in load characteristic with a compression board of 20 mm in diameter.

16. A seat structure comprising a cushioning structure having a seat cushioning member for a seat cushion and a back cushioning member for a seat back, wherein said seat cushioning member and said back cushioning member are provided as a tension structure having a tension field formed from an elastic member, and at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;

wherein said cushioning structure forms a vibration system in which an arbitrary portion of the seat cushioning member positioned more front than the vicinity of the boundary of the seat cushion portion and the seat back portion and/or an arbitrary portion of the back cushioning member positioned upper than the vicinity of said boundary portion serves as an free end by putting an extendable direction on the plane surface of the cushioning structure alone the back-and-forth direction of the seat cushion portion and along the vertical direction of the seat back portion respectively, and by holding the vicinity of the boundary portion of the seat cushion portion and the seat back portion; and wherein in at least one of said seat cushioning member and back cushioning member in which said vibration system is formed, tension in the tangential direction is varied by changing the strain energy of the tension structure formed from an elastic member in accordance with the excitation force to be an input, and at least the other of said seat cushioning member and back cushioning member includes a portion exhibiting relatively high spring characteristics in the normal line direction of the tension structure, and has a structure in which an excitation force inputted from the normal line direction to said cushioning member is scatterable into an excitation force in the tangential direction by a combined function of these different characteristics;

wherein said back cushioning member is formed of a three-dimensional net member, and structured in a manner that frames supporting the three-dimensional net member deform when a large impact vibration or impact force equal to or more than predetermined is applied so that the tension of the three-dimensional net member is lowered.

17. A seat structure comprising a cushioning structure having a seat cushioning member for a seat cushion and a back cushioning member for a seat back, wherein said seat cushioning member and said back cushioning member are provided as a tension structure having a tension field formed from an elastic member, and at least one of said seat cushioning member and back cushioning member is structured to vary the tension in the tangential direction by changing the strain energy in accordance with the magnitude of an excitation force to be an input, and different damping characteristics are exhibited according to the magnitude of the excitation force to be an input in such a manner that the damping characteristics function at a small damping ratio for an input of a small excitation force, and the damping characteristics function at a large damping ratio for an input of a large excitation force;

wherein said back cushioning member is formed with a tension structure with urethane provided with a two-dimensional tension structure and an urethane layer layered on the two-dimensional tension structure, and structured in a manner that frames supporting the tension structure with urethane deform when a large impact vibration or impact force equal to or more than predetermined is applied so that the tension of the tension structure with urethane is lowered.

* * * * *